United States Patent
Ueda et al.

[19]

[11] Patent Number: 6,041,091
[45] Date of Patent: *Mar. 21, 2000

[54] CONTROL ROD FOR NUCLEAR REACTOR

[75] Inventors: Makoto Ueda, Yokohama; Shigenori Shiga, Fujisawa; Satoko Tajima; Hideki Morishita, both of Yokohama, all of Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/906,243

[22] Filed: Aug. 4, 1997

[30] Foreign Application Priority Data

Aug. 8, 1996 [JP] Japan .................................. 8-209925

[51] Int. Cl.[7] .............................. G21C 7/00; G21C 7/113
[52] U.S. Cl. ............................................ 376/327; 376/333
[58] Field of Search ........................................ 376/327, 333

[56] References Cited

U.S. PATENT DOCUMENTS

| | | | |
|---|---|---|---|
| 4,876,060 | 10/1989 | Yoshioka et al. | 376/333 |
| 5,034,185 | 7/1991 | Ueda et al. | 376/333 |
| 5,276,718 | 1/1994 | Ueda | 376/220 |

OTHER PUBLICATIONS

M. Ueda, et al. "Critical Experiment on a Flux–Trap–Type Hafnium Control Blade for BWRs", Transactions of American Nuclear Society, (Winter Meeting, 1987), Los Angeles, vol. 55, (1987), pp. 616–617.

Primary Examiner—Charles T. Jordan
Assistant Examiner—Jack W. Keith
Attorney, Agent, or Firm—Oblon, Spivak, McClelland, Maier & Neustadt, P.C.

[57] ABSTRACT

A control rod for a nuclear reactor is composed of a center structural member, a plurality of wings each composed of a sheath member of long plate structure having a U-shaped cross section and secured to the center structural member, a front end structural member secured to a front end side of the wing in a wing inserting direction in a reactor core, a terminal end structural member secured to a terminal end side of the wing, a plurality of integral type neutron absorbing elements each having a plate structure accommodated in each of the sheaths in a row in a longitudinal direction thereof and each being formed in plate shape by integrating one or more neutron absorbing plates, and a plurality of load supporting members for supporting weights of the integral type neutron absorbing elements. A length in the sheath longitudinal direction of at least one set of the integral type neutron absorbing elements accommodated in the wing is reduced, and the reduced integral type neutron absorbing elements are supported to the U-shaped sheath by the load supporting members to thereby reduce a local load applied to the U-shaped sheath.

3 Claims, 20 Drawing Sheets

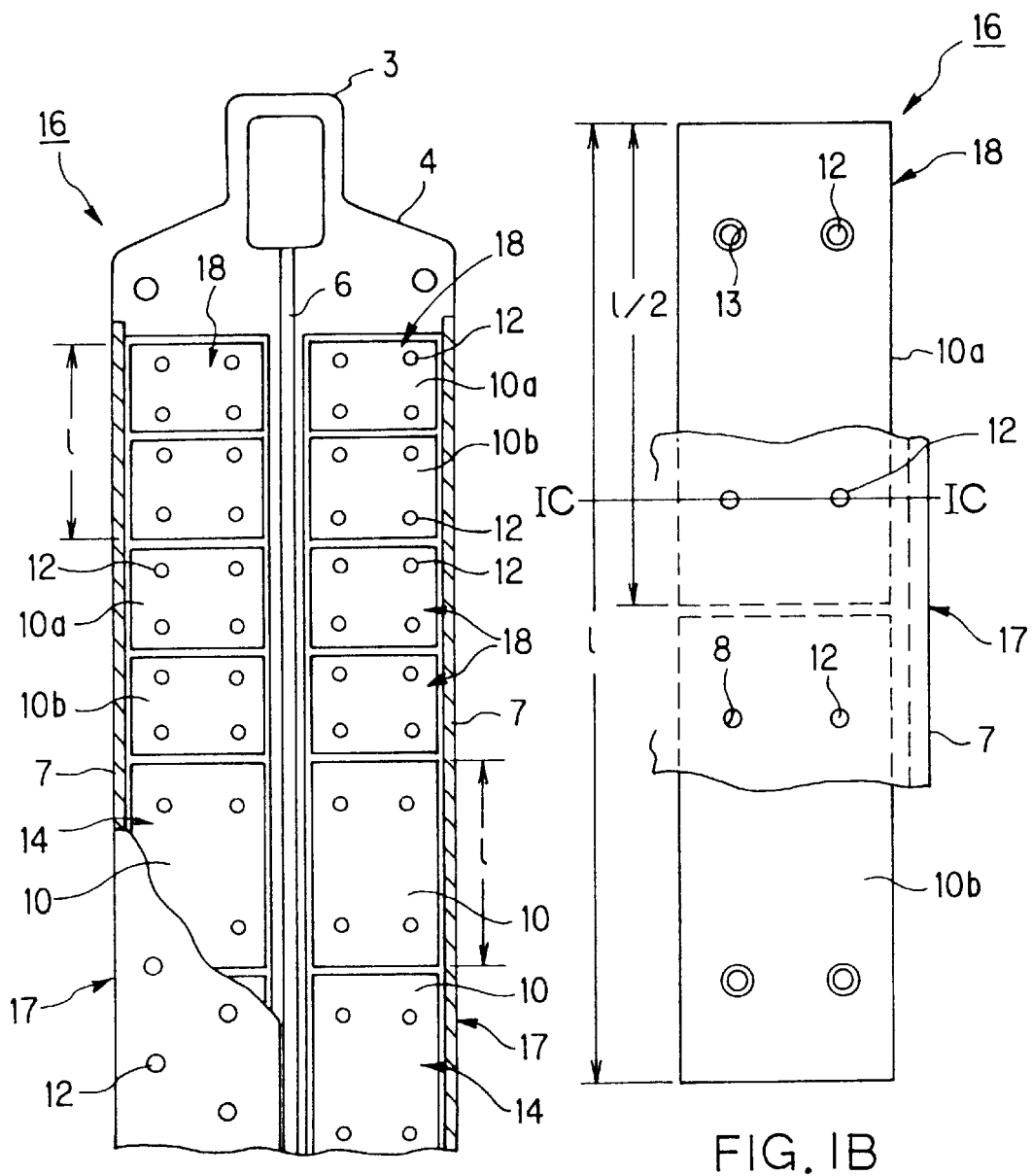
FIG. 1A
FIG. 1B
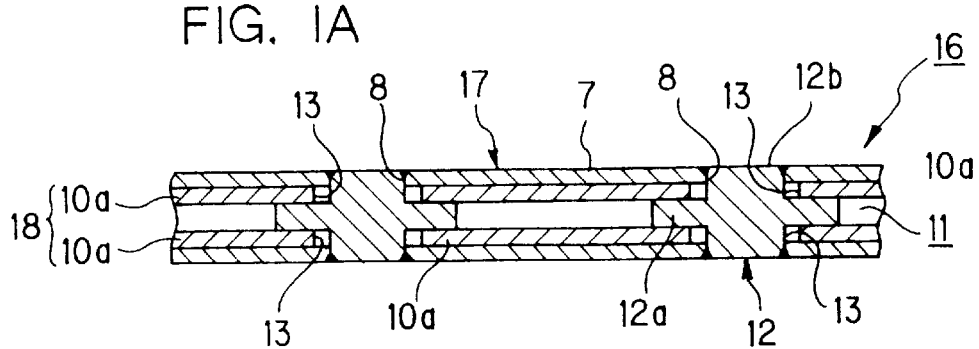
FIG. 1C

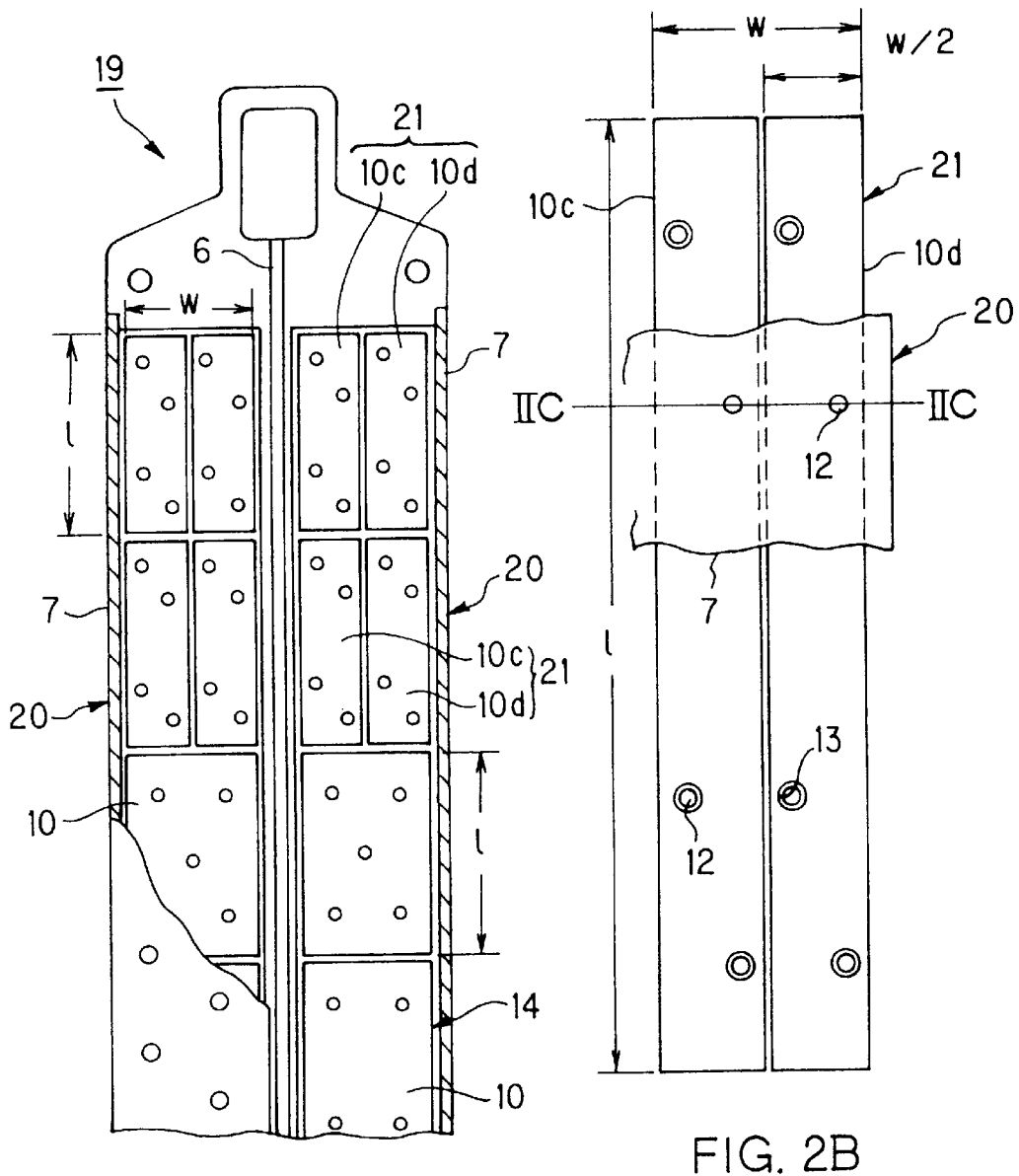
FIG. 2A
FIG. 2B
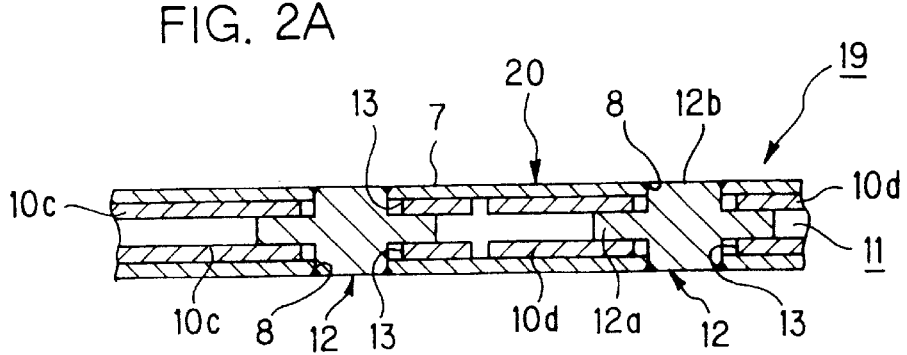
FIG. 2C

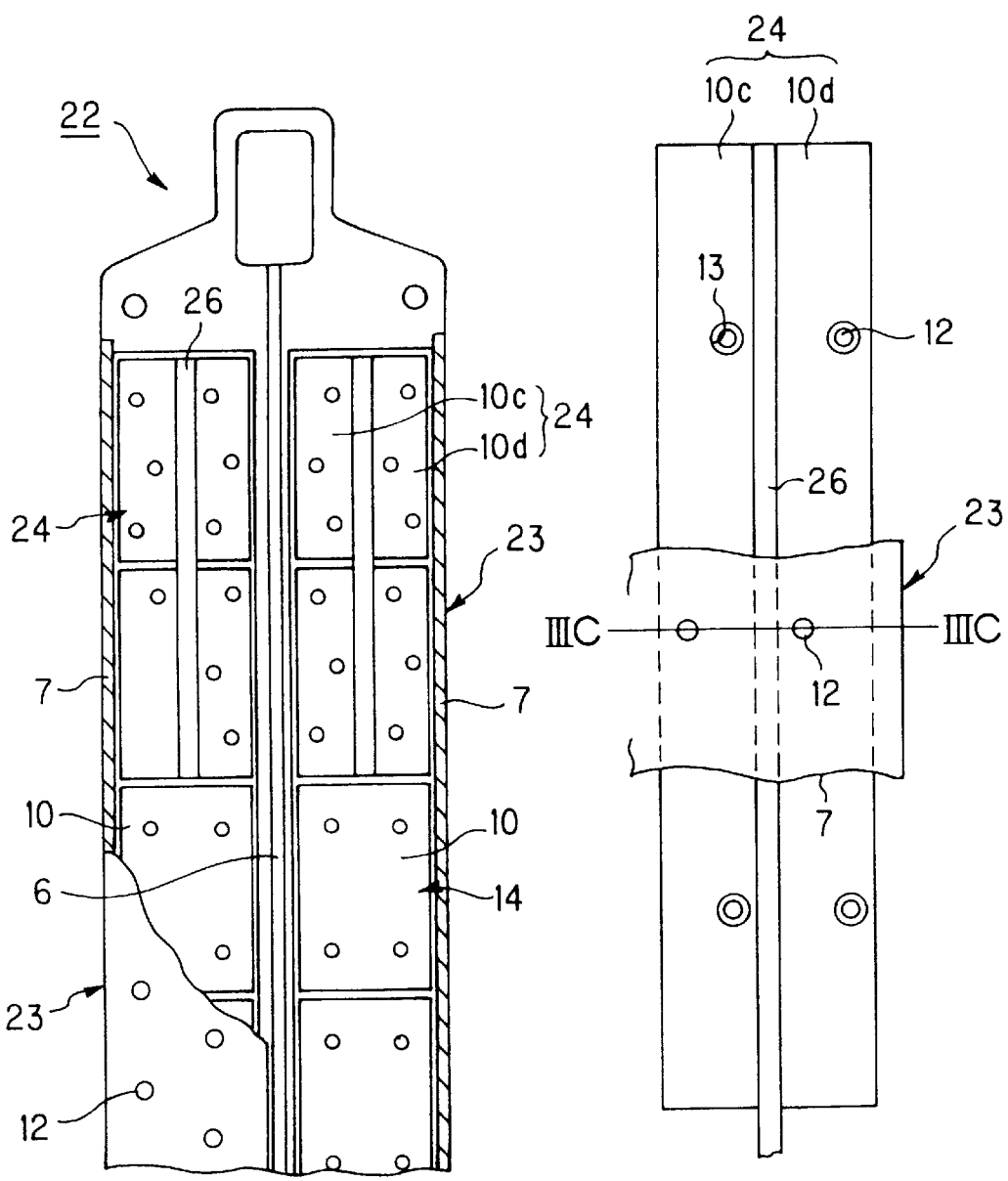
FIG. 3A
FIG. 3B
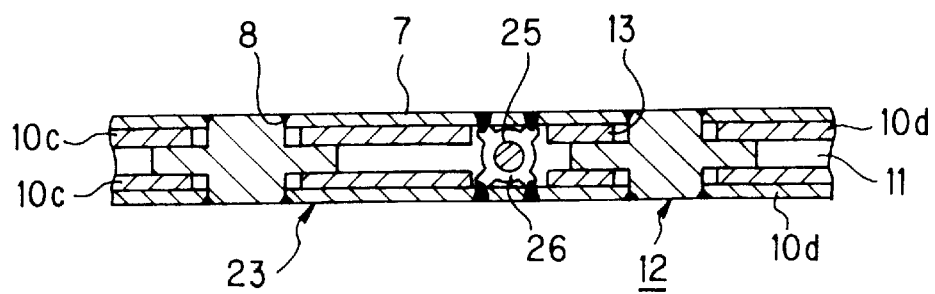
FIG. 3C

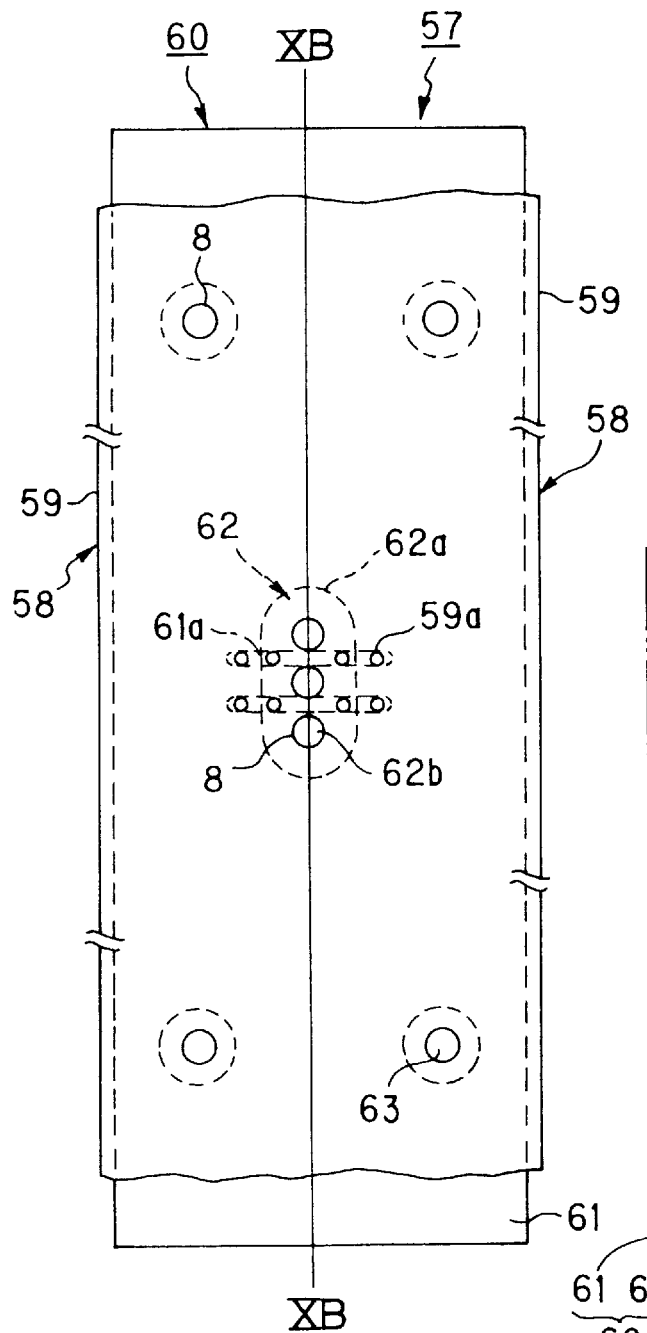
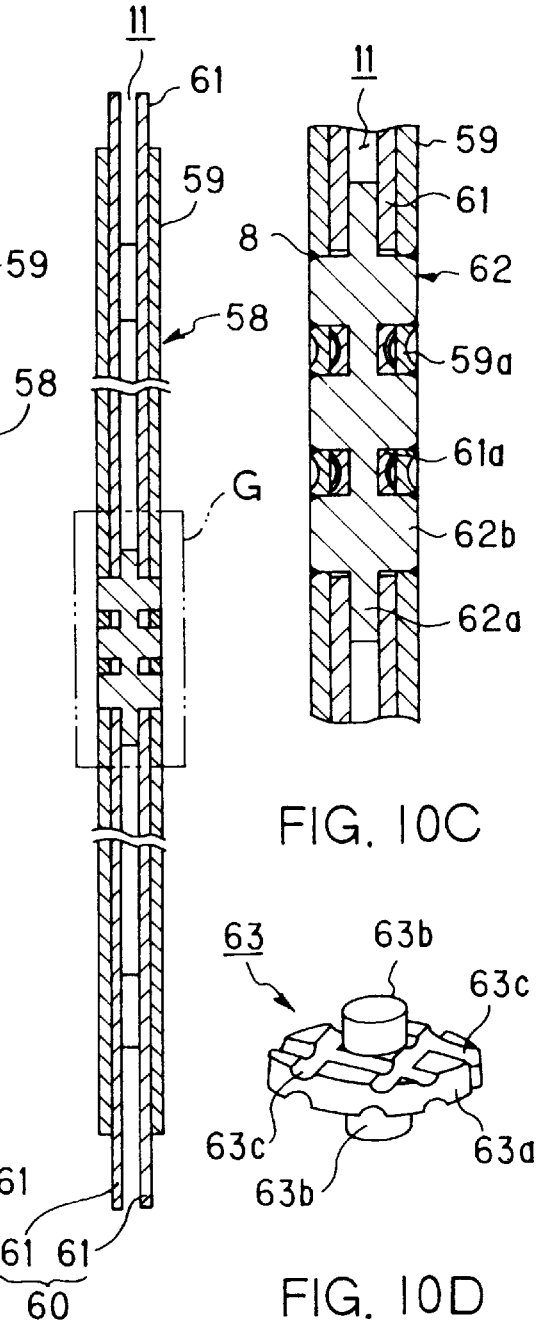
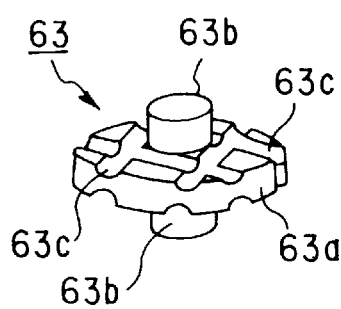
FIG. 10A  FIG. 10B  FIG. 10C  FIG. 10D

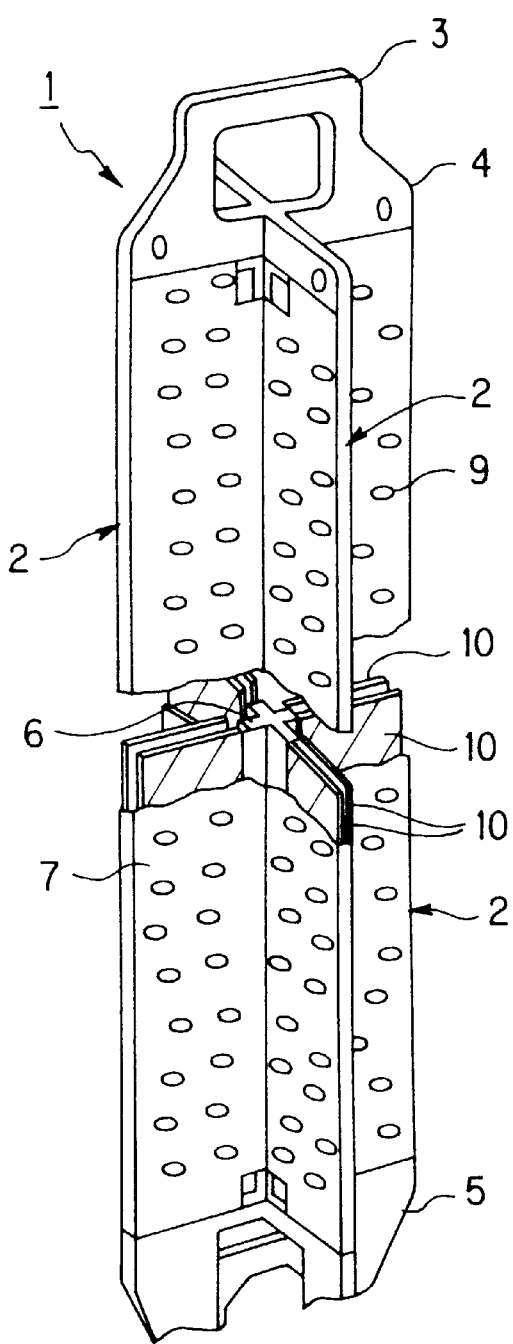
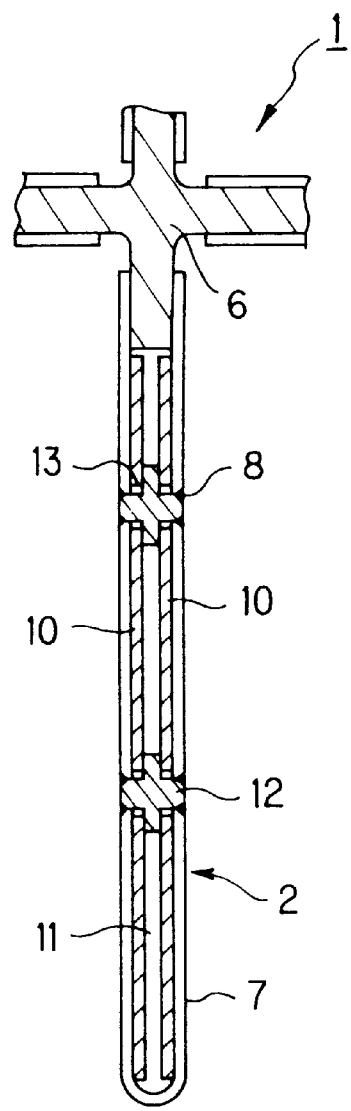
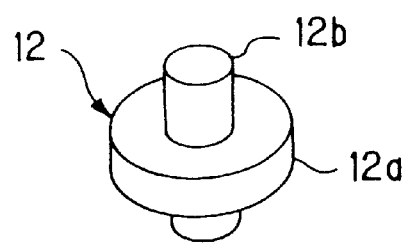
FIG. 19A
PRIOR ART
FIG. 19B
PRIOR ART
FIG. 19C
PRIOR ART

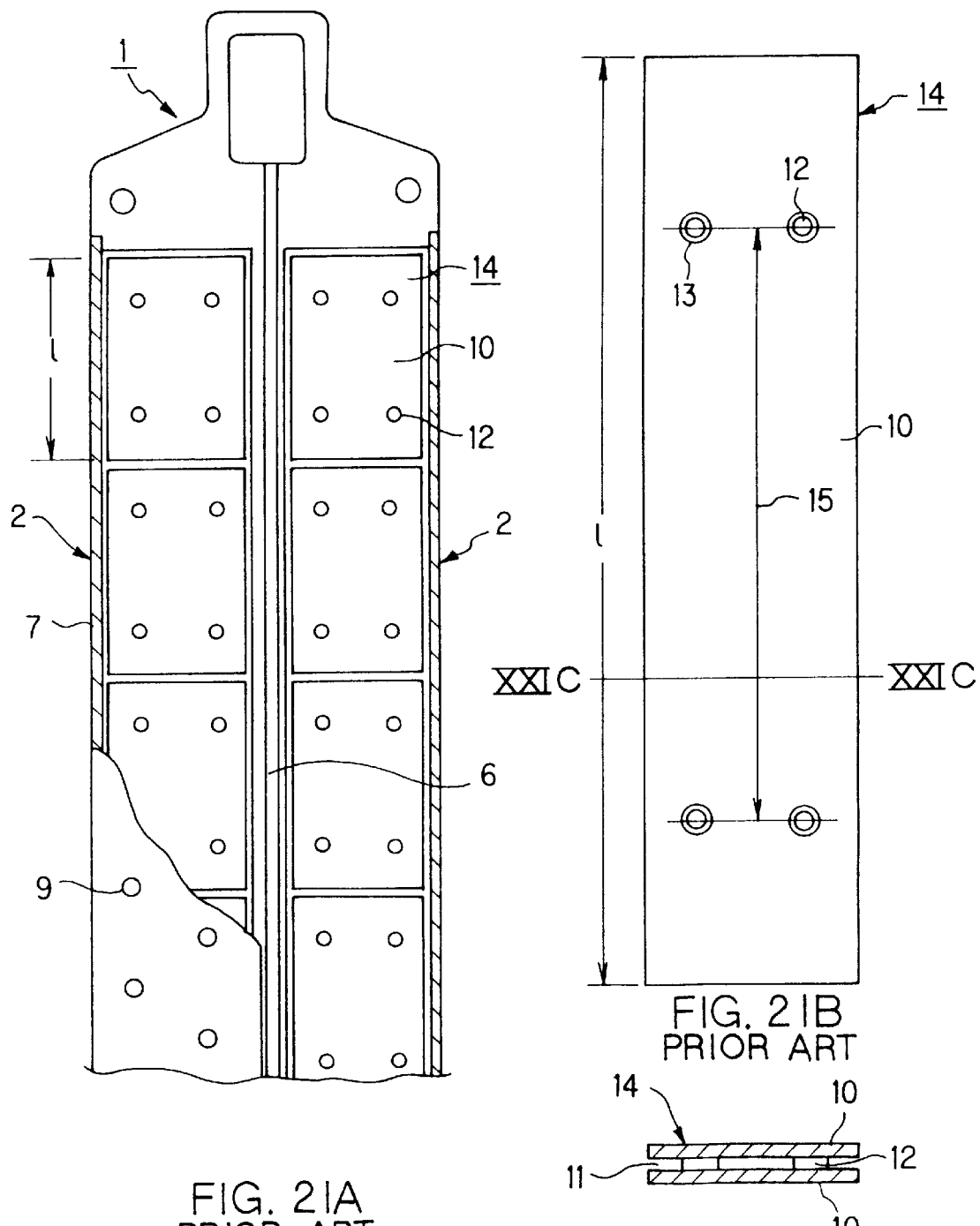
FIG. 21A
PRIOR ART
FIG. 21B
PRIOR ART
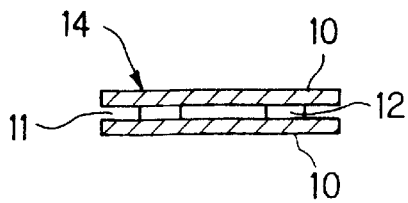
FIG. 21C
PRIOR ART

CONTROL ROD FOR NUCLEAR REACTOR

BACKGROUND OF THE INVENTION

The present invention relates to a control rod for a nuclear reactor, and more particularly, to a control rod for a nuclear reactor of the long-life type having an improved mechanical soundness in a boiling water reactor.

A control rod for a boiling water reactor (BWR) has usually four wings formed by housing neutron absorber plates in a plurality of long sheaths having a deep U-shaped cross-section. A leading end structural member is provided at an insertion leading end portion of each of the wings, or a terminal end structural member, at an insertion terminal end portion thereof, and the U-shaped openings of the sheaths in each of four wings are secured to an integral type center structural member (known also as a tie rod) having a cruciform cross-section to provide a cruciform sectional configuration or arrangement.

In a conventional control rod, the sheath is made of stainless steel (S.S such as SUS, hereinafter abbreviated as "SUS"), and a SUS tube having a diameter of 5 mm filled with boron carbide ($B_4C$) powder has been employed as a neutron absorbing rod.

Boron (B) has however a short nuclear life because it reacts with neutron to generate helium (He) and lithium (Li), resulting in a degraded neutron absorbing ability, and helium causes an increase in internal pressure, leading to a decrease in soundness of the SUS tube and hence to a shorter mechanical and physical service life.

In order to provide a control rod having a long service life, there has been used a long-life type control rod manufactured by replacing a conventional neutron absorbing rod partially or totally by hafnium (hereinafter abbreviated as "Hf") which is a long-life type neutron absorber.

Since Hf has a large specific gravity (density) as about 13, an Hf rod having the same cross-section as a conventional neutron absorbing rod using boron carbide results in a weight about 1.5 times as large as the control rod as a whole, although the neutron absorbing ability (reactivity value) is substantially the same, making it impossible to back-fit it into a nuclear reactor in operation.

As a counter-measure, Japanese Patent Laid-open (KOKAI) Publication No. HEI 1-34358 "Control Rod for Nuclear Reactor" proposes an Hf control rod of the type known as a trap type in which Hf is formed into a plate shape, and two Hf plates are arranged opposite to each other with a gap for introduction of water.

Further, in view of the fact that in about the terminal end side half of a control rod for the BWR, upon insertion thereof into the reactor core, a decreased neutron absorbing ability would cause no inconvenience in the control of the BWR, a control rod configured so as to use a smaller Hf content in the portion on the insertion terminal end side than in the portion on the insertion leading end side is proposed in Japanese Patent Laid-open Publication No. HEI 7-3468 "Control Rod for Nuclear Reactor".

Regarding the long-life control rod having the trap structure using the Hf plate, excellent results have already been achieved in many BWRs, and it is the usual practice to set a short service life for maintenance purposes.

When setting a longer service life, it becomes now clearer than ever that it is effective to improve mechanical strength of SUS structural members such as a sheath in the control rod.

FIGS. 19 to 21 illustrate an outline of an Hf trap type control rod, in which FIG. 19A is a partially cutaway perspective view, FIG. 19B is a sectional view of a wing and FIG. 19C is a perspective view of a load supporting member (also referred to as a "load supporting spacer" of "top spacer").

FIG. 20A is a partially cutaway front view of a sheath shown in FIG. 19A, and FIG. 20B illustrates an example of thickness of an Hf plate which is a neutron absorber plate of a neutron absorbing material attached in the interior of a sheath, as illustrated in a distribution diagram in the control rod insertion/withdrawal direction which is the sheath longitudinal direction.

FIG. 21A is a partially enlarged front view of FIG. 20A, FIG. 21B is an enlarged front view of a pair of Hf plates shown in FIG. 21A, and FIG. 21C is a sectional view of FIG. 21C taken along the line XXIC—XXIC of FIG. 21B.

Referring to these figures, a long-life type control rod 1 has a cruciform section with four wings 2, and a leading end structural member 4 integral with a handle 3 is secured to the insertion leading end portion into the reactor core, and a terminal end structural member 5 is secured to an insertion terminal end portion.

Further, a cruciform integral type center structural member 6 made of SUS is provided at an axial center of the control rod 1 (central tie rod), and an opening portion of a sheath 7 made of SUS having a deep U-shaped cross-section forming an outer periphery of the wing 2 is secured by welding to each projection of this integral type center structural member 6.

A plurality of sheath holes 8 and water holes 9 are pierced in the sheath 7, in which two Hf plates 10 which are neutron absorber plates are supported by a load supporting member 12 also serving as a gap (interval) maintaining space, and a water gap 11 (gap through which cooling water flows during use in the reactor) is formed between the two Hf plates 10.

The load supporting member 12 has a top-like shape, and the thickness of a gap maintaining portion 12a at the center thereof has a function of spacer. The Hf plates 10 are supported by attaching the Hf plates 10 from both the sides to a support shaft 12b through an attachment hole 13 and causing engagement of the support shaft 12b with a sheath hole (bore) 8, which are secured together by means of welding.

When inserting or withdrawing the control rod 1 into or from the reactor core, a percussive force is applied to the sheath 7 upon intermittent driving, or particularly, upon starting driving or decelerating during scram of the reactor.

In a long-life type control rod 1, the sheath 7 and the load supporting member 12 made of SUS forming the wing 2 have a thermal expansion coefficient about three times as high as that of the Hf plate 10, which is the neutron absorber formed of a material different from those of the sheath 7 and the load supporting member 12. For example, while SUS has a thermal expansion coefficient of $17.8 \times 10^{-6}$/deg-C., that of Hf is $5.9 \times 10^{-6}$/deg-C. ("Nuclear Reactor Materials Handbook" published by Nikkan Kogyo Shinbun-sha).

To avoid inconveniences resulting therefrom, the attachment hole 13 of the Hf plate 10 to be attached to the support shaft 12b of the load supporting member 12 has a diameter larger than that of the support shaft 12b to provide a margin, thereby permitting avoidance of their mutual interference through expansion and contraction in heat cycles during operation of the reactor.

In the example shown in FIG. 20, the Hf plate 10 of the control rod 1 having a length L in the inserting direction into the reactor core or the sheath longitudinal direction is longitudinally and equally divided into eight sections. The length 1 of a single Hf plate 10 is therefore about L/8.

FIGS. 20 and 21A are described with a scale compressed in the axial direction for convenience of illustration, and FIG. 21B represents the Hf plate substantially similarly to the actual one.

Within the wing 2, two Hf plates 10 which are neutron absorber plates arranged opposite to each other form an Hf plate pair 14 which is held by the sheath 7 through four (or three, five or six) load supporting members 12.

The attachment hole 13 of the Hf plate and the sheath hole 8 of the sheath 7 have the same pitch 15 size in the sheath longitudinal direction.

During inserting or withdrawing operation of the control rod 1, the sheath 7 is subjected, not only to a static load caused by the weight of the Hf plate pair 14 applied through the load supporting member 12 in the stationary state, but also to a dynamic load caused by the relative displacement to the Hf plate pair 14. This load caused by relative displacement becomes an impact load particularly upon intermittent operation or driving starting operation or decelerating operation during a rapid driving in the scram of the reactor.

These loads tend to be believed to be shared by the four load supporting members 12 in general and transmitted to the sheath 7. Actually, however, even when a margin is provided taking account of a difference in thermal expansion caused by the difference in thermal expansion coefficient between different materials such as between the attachment hole 13 of the Hf plate and the support shaft 12b of the load supporting member 12, it is conceivable that a single load supporting member bears all the load because of, for example, the manufacturing tolerance.

In the worst case, a specific unknown load supporting member 12 receives a large stress, thus causing a local stress to concentrate on the sheath hole 8 at the position where that load supporting member is secured. This is therefore undesirable from the point of view of ensuring soundness of the sheath 7.

In the Hf plate 10 of the Hf plate pair 14, as shown in FIG. 20B, the neutron irradiation is larger at a position closer to the insertion leading end and the reactivity value must be increased. The thickness becomes therefore thicker toward the insertion leading end and thinner toward the insertion terminal end.

The length in the control rod insertion/withdrawal direction, which is the sheath longitudinal direction of each Hf plate 10, is usually constant, and the thickness of the sheath 7 is also uniform in the control rod insertion/withdrawal direction. A wider water gap corresponds to a higher reactivity value.

The sheath 7 should therefore be preferably the thinnest possible. However, since the thickness of the sheath 7 is associated with strength of the sheath 7, an excessive reduction of thickness causes deterioration of mechanical soundness, thus preventing improvement of service life of the control rod 1.

More specifically, the distribution in the sheath longitudinal direction of the load acting on the sheath 7 is such that the load is larger toward the insertion leading end because of the thicker Hf plate 10. When designing the thickness of the sheath 7, therefore, it is necessary to sufficiently take account of the weight of the Hf plates 10 serving as the neutron absorber plates and the impact load received upon operation of the control rod 1, as well as mechanical strength with due regards to the manufacturing tolerance.

When a horizontal impact is caused by an earthquake or the like, a relatively large stress occurs near the central portion in the longitudinal direction of a long control rod 1. Ensuring a satisfactory mechanical strength for the proximity of the middle is an important task.

Therefore, using the control rod 1 for the longest possible period of time contributes to improvement of reliability of the control rod and economic merits of reactor operation. In order to further extend the service life of the long-life type control rod 1, it is necessary to increase mechanical strength having so far formed a restriction as compared with the nuclear life in neutron absorption.

SUMMARY OF THE INVENTION

A primary object of the present invention is to substantially eliminate defects or drawbacks encountered in the prior art and to provide a control rod for a nuclear reactor, which has a mechanical strength improved through supporting manner of neutron absorbers in a long-life type control rod and has a further longer service life in balance with the nuclear life.

Another object of the present invention is to provide a control rod for a nuclear reactor which is improved in mechanical and physical strength, making it possible to use for a long time and achieving reliability and economical merits in the reactor operation.

A further object of the present invention is to provide a control rod for a nuclear reactor capable of reducing a load applied per one load supporting member acting on a U-shaped sheath and reducing a local stress applied to the U-shaped sheath to thereby enhance the soundness of the control rod.

A still further object of the present invention is to provide a control rod for a nuclear reactor capable of improving a reactivity value as well as improving the soundness of the U-shaped sheath.

A still further object of the present invention is to provide a control rod for a nuclear reactor capable of further improving a stress resisting property and the mechanical strength of the U-shaped sheath by separately carrying an integral type neutron absorbing element.

A still further object of the present invention is to provide a control rod for a nuclear reactor capable of maintaining the soundness of the load supporting member and the integral type neutron absorbing element to thereby improve the life time and the reliability of the control rod.

A still further object of the present invention is to provide a control rod for a nuclear reactor having an improved mechanical and physical strength by increasing and ensuring reliability of a weld portion through abut-welding of the U-shaped sheath against a recessed projection of a central structural member.

These and other objects can be achieved according to the present invention, which provides in a general aspect, a control rod for a nuclear reactor comprising a center structural member, a plurality of wings each composed of a sheath member of long plate structure having a U-shaped cross section having an opening which is secured to the center structural member, a front end structural member secured to a front end side of the wing viewed from a wing inserting direction in a reactor core, a terminal end structural member secured to a terminal end side of the wing viewed from the wing inserting direction in the reactor core, a plurality of integral type neutron absorbing elements each having a plate structure accommodated in each of the sheaths in a row in a longitudinal direction thereof and each being formed in plate shape by integrating one or more neutron absorbing plates, and a plurality of load supporting members for supporting weights of the integral type neutron absorbing elements.

According to the present invention, the following characteristic features will be provided to the control rod for a nuclear reactor of the structure mentioned above.

The length in the sheath longitudinal direction of at least one set of the integral type neutron absorbing elements accommodated in the wing is reduced, the reduced integral type neutron absorbing elements are supported to the U-shaped sheath by the load supporting members to thereby reduce a local load applied to the U-shaped sheath.

At least a set of integral type neutron absorbing elements having a relatively large weight are divided into a plurality of sections in a wing width direction, weight of the divided integral type neutron absorbing element sections are supported to the U-shaped sheath respectively by a plurality of load supporting members so that total supporting ability of the plurality of load supporting members which support the divided integral type neutron absorbing element sections surpasses supporting ability of the load supporting members of the integral type neutron absorbing elements not yet divided. The integral type neutron absorbing elements divided into the plurality of sections in the wing width direction is provided with a stiffener containing a neutron absorber to at least one portion of the divided neutron absorbing element and the stiffener is secured to the U-shaped sheath. In the integral type neutron absorbing elements divided into the plurality of sections in the wing width direction, a neutron absorbing ability per unit length in the wing width direction of the integral type neutron absorbing elements located on an outside edge of the wing is increased as compared with that of portions other than the wing outside edge.

The integral type neutron absorbing element is formed with an attachment hole into which a support shaft of the load supporting member is inserted with a margin, at least two attachment holes are formed with space in the sheath longitudinal direction respectively on both inside and outside portions in the wing width direction, and a distance between a pair of two load supporting members in the sheath longitudinal direction is made different in accordance with a pitch of the attachment hole in the sheath longitudinal direction being in a range less than a margin of a diameter of the attachment hole exceeding manufacturing tolerance. Two load supporting members paired in the sheath longitudinal direction having the attachment holes of different pitches in the sheath longitudinal direction are disposed inside in the wing width direction.

The integral type neutron absorbing element is formed with an attachment hole into which a support shaft of the load supporting member is inserted with a margin, at least two attachment holes are formed with space in the sheath longitudinal direction respectively on both inside and outside portions in the wing width direction, and a pitch in the sheath longitudinal direction of the attachment hole of the integral type neutron absorbing element is different in a range less than a margin of a diameter of the attachment hole exceeding a manufacturing tolerance compared with a pitch in the sheath longitudinal direction between the load supporting members. The attachment hole having a pitch in the sheath longitudinal direction different from a pitch in the sheath longitudinal direction between the load supporting members are formed inside in the wing width direction of the integral type neutron absorbing element.

At least a part of the plurality of load supporting members supporting the integral type neutron absorbing element is arranged in a vicinity of a central portion of the integral type neutron absorbing element, and a margin between a support shaft of the load supporting member disposed near the central portion thereof and an attachment hole of the integral type neutron absorbing element into which the support shaft is inserted is made less than a margin between another support shaft of another load supporting member other than that disposed near the central portion of the neutron absorbing element and an attachment hole formed thereto into which the another support shaft is inserted to thereby increase a load supporting ability.

The integral type neutron absorbing element is composed of a long-life type neutron absorbing plate by forming a hafnium alloy into a plate shape diluted by diluting hafnium with a diluting agent such as zirconium or titanium, and the integral type neuron absorbing element has a trap structure based on a combination of a plurality of the neutron absorber plates with a water gap serving as a reactor water channel, and the load supporting member is provided with a gap maintaining function between the neutron absorber plates.

The integral type neutron absorbing element is formed with an attachment hole into which a support shaft of the load supporting member is inserted with a predetermined margin, the load supporting members are disposed on the control rod inserting front end side and inserting terminal end side of the integral type neutron absorbing element in a manner separated in a wing width direction, and a margin in engagement between either one of support shafts in the wing width direction of the load supporting members and the attachment hole of the integral type neutron absorbing element is made smaller than a margin in engagement between another one support shaft of the load supporting member and the attachment hole of the integral type neutron absorbing element.

The integral type neutron absorbing element is provided with an attachment hole to which the load supporting member secured to the sheath is inserted with a predetermined margin, the load supporting members secured to the sheath are attached to the attachment holes of the integral type neutron absorbing elements and also provided with a frictional load supporting member having a gap maintaining function and a frictional resistance function between the neutron absorber plate constituting the integral type neutron absorbing element and the U-shaped sheath. The frictional load supporting member is composed of a projection projecting from an inner surface of the U-shaped sheath, and a recessed portion formed to a surface of the neutron absorber plate and engaged with the projection to thereby imparting the frictional resistance function.

The support shafts of the load supporting members secured to the U-shaped sheath are fitted to attachment holes formed to the integral type neutron absorbing element with a predetermined margin, and the support shaft of a specific member of the load supporting members and a corresponding attachment hole of the integral type neutron absorbing element have large diameters in comparison with those of the other load supporting members to improve a load supporting ability. The specific load supporting member is arranged inside in a wing width direction.

The plurality of integral type neutron absorbing elements include the neutron absorbers each having a thickness gradually reduced from the leading end side of control rod insertion toward the terminal end side thereof and the length of the neutron absorber is increased toward the insertion terminal end side.

The plurality of integral type neutron absorbing elements are reduced in lengths thereof at portions near a central portion of an entire length of the control rod and a load supporting member is arranged also at central portions in a wing width direction and in a sheath longitudinal direction of at least part of the integral type neutron absorbing elements on the control rod insertion end side.

The plurality of integral type neutron absorbing elements have substantially uniform lengths throughout an entire length of the control rod and a load supporting member is provided at a central portion in a wing width direction and in a sheath longitudinal direction of the integral type neutron absorbing element up to substantially ⅔ length from the leading end in the control rod inserting direction.

The integral type neutron absorbing element is composed of a neutron absorbing plate by forming a hafnium alloy into a plate shape diluted by diluting hafnium with a diluting agent such as zirconium or titanium, the integral type neuron absorbing element has a trap structure based on a combination of a plurality of the neutron absorber plates with a water gap being interposed therebetween, and the opposing neutron absorber plates with the water gap being interposed therebetween are arranged stepwise in a control rod insertion/withdrawal direction.

The integral type neutron absorbing element is composed of a neutron absorbing plate by forming a hafnium alloy into a plate shape diluted by diluting hafnium with a diluting agent such as zirconium or titanium, the integral type neuron absorbing element has a trap structure based on a combination of a plurality of said neutron absorber plates with a water gap being interposed therebetween, the neutron absorber plate has a thickness gradually reduced from the leading end side of the control rod insertion toward the terminal end side thereof and the load supporting member to be secured to the U-shaped sheath is fitted to the attachment hole with a predetermined margin, two such load supporting members are each provided at an interval in the sheath longitudinal direction, and an interval maintaining member secured to the U-shaped sheath at central portions in a wing width direction and a sheath longitudinal direction between the load supporting members is mounted to at least one set of the integral type neutron absorbing elements. The neutron absorber plates of at least one set of integral type neutron absorbing elements are made of a hafnium alloy diluted by a diluting agent such as zirconium or titanium and having a hafnium content equal to that in neutron absorber plates of another integral type neutron absorbing element, and the neutron absorber plates made of the hafnium alloy each has an increased thickness to thereby improve mechanical and physical strengths.

The integral type neutron absorbing element is composed of a neutron absorbing plate by forming a hafnium alloy into a plate shape diluted by diluting hafnium with a diluting agent such as zirconium or titanium, the integral type neuron absorbing element is formed with a water gap in a control rod insertion/withdrawal direction in the U-shaped sheath and has substantially a box-shaped sectional shape in a direction perpendicular to the control rod insertion/withdrawal direction.

The center structural member is formed with a recessed projection having a thickness equal to that of the wing and extending in a longitudinal direction thereof on a side to be secured to the U-shaped sheath.

According to the present invention of the various aspects mentioned above, there are achieved the following functions and advantageous effects.

In one aspect, there is provided a control rod for a nuclear reactor constructed by securing a leading end structural member to a leading end, and a terminal structural member to a terminal end in the core inserting direction by means of a long sheath having a U-shaped cross-section, securing or integrating flat with a tolerance of slight sliding one or more sheet-shaped neutron absorbing plates divided into a plurality of sections in the sheath longitudinal direction, housing the integral type neutron absorbing elements into the sheath, forming a plurality of wings so as to hold the weight of the individual integral type neutron absorbing elements through a plurality of load supporting members by the sheath, and securing a U-shaped opening of each of the plurality of wings to an opening side structural member formed by an integral type center structural member of an independent type structural member, and the length in the sheath longitudinal direction of at least one set of integral type neutron absorbing elements, of which the weight becomes relatively large, is reduced to alleviate a local load exerted on the sheath.

According to the above aspect of the present invention, by reducing the weight by reducing the length of the integral type neutron absorbing elements which are relatively heavy at the insertion leading end into the reactor core, the load per load supporting member is reduced, thereby securing the load supporting member and reducing local stress at the position where the load supporting member is secured in the sheath holding the load of the integral type neutron absorbing elements.

At least a set of integral type neutron absorbing elements having a relatively large weight are divided into a plurality of sections in a direction at right angles to the longitudinal direction of the sheath, so that the total supporting ability of the plurality of load supporting members which support the divided integral type neutron absorbing elements surpasses the supporting ability of the load supporting members of the integral type neutron absorbing elements not as yet divided.

Furthermore, because the load per load supporting member is reduced by the reduction of weight of the integral type neutron absorbing elements, local stress on the sheath holding the load of the integral type neutron absorbing elements by securing the load supporting member is reduced.

According to the present invention, there is provided a control rod for a nuclear reactor, in the integral type neutron absorbing elements divided into the plurality of sections in a direction normal to the longitudinal direction of the sheath, a stiffener containing a neutron absorber is arranged at least at a place in the integral type neutron absorbing element sections resulting from division of the integral type neutron absorbing elements into the plurality of sections, and the stiffener is secured to the sheath.

Accordingly, mechanical and physical strength of the sheath is improved because the load applied per load supporting member is reduced, and further, since a long-life type neutron absorber is housed in the stiffener, there occurs almost no decrease in the reactivity value of the control rod.

According to the present invention, in the integral type neutron absorbing elements divided into the plurality of sections in a wing width direction, the neutron absorbing ability per unit length in the wing width direction of the integral type neutron absorbing elements located on the outer edge of the wing is increased as compared with that of portions other than the wing outer edge.

Therefore, the reduction of the load acting on the load supporting member leads to an improved soundness of the sheath. When using integral type neutron absorbing elements of the same weight, the reactivity value of the control rod can be improved with an extended nuclear life.

When it is not necessary to improve the reactivity value or the nuclear life, the weight is reduced by reducing the quantity of integral type nuclear absorbing elements, thereby further improving soundness of the sheath supporting the same.

According to the present invention, the integral type neutron absorbing elements are attached to the support shaft and the attachment hole of the load supporting member secured to the sheath in the attachment hole with a predetermined margin, at least two such load supporting members each are provided at an interval in the sheath longitudinal direction, and the distance between predetermined two load supporting members forming a pair in the sheath longitudinal direction varies within a range in which the pitch between a pair of attachment holes in the integral type neutron absorbing elements is over a manufacturing tolerance and under the margin of the attachment hole.

When the integral type neutron absorbing elements move relative to the sheath, any one of the two specified load supporting members forming a pair in the sheath longitudinal direction bears the load when inserting or when withdrawing. The two load supporting members are specified depending upon the direction of insertion or withdrawal, thus certainly sharing the load. The load per each load supporting member is therefore reduced to a half, and this improves, together with the load supporting members, stress resistance and mechanical strength of the sheath.

According to the present invention, the two load supporting members forming a pair in the sheath longitudinal direction, different from the pitch between a pair of the attachment holes are closer to the structural member for securing the wing. In the sheath of the wing, the side secured to the structural member has a higher mechanical strength than that on the opposite side. By causing the load supporting member closest to this structural member to bear the load of the integral type neutron absorbing elements, the stress resistance and the mechanical strength of the sheath securing this load supporting member can be improved.

According to the present invention, the integral type neutron absorbing elements are attached to the support shaft and the attachment hole of the load supporting member secured to the sheath in the attachment hole with a predetermined margin, at least two such load supporting members each are provided at an interval in the sheath longitudinal direction, and as compared with the pitch between a pair of the load supporting members, the distance between the two prescribed load supporting members forming a pair in the sheath longitudinal direction varies within a range in which the pitch between a pair of attachment holes in the integral type neutron absorbing elements is over a manufacturing tolerance and under the margin of the attachment hole.

When the integral type neutron absorbing elements move relative to the sheath, any one of the two prescribed load supporting members forming a pair in the sheath longitudinal direction bears the load when inserting or when withdrawing. The two load supporting members are specified depending upon the direction of insertion or withdrawal, thus certainly sharing the load. The load per each member is therefore reduced to a half, and this improves, together with the load supporting members, the stress resistance and the mechanical strength of the sheath.

According to the present invention, the attachment holes of the two integral type neutron absorbing elements forming a pair in the sheath longitudinal direction are closer to the structural member securing the wing. In the sheath of the wing, the side secured to the center structural member has a higher mechanical strength than that on the opposite side. By Causing the load supporting member closest to this structural member to bear the load of the integral type neutron absorbing elements, the stress resistance and the mechanical strength of the sheath securing this load supporting member can be improved.

According to the present invention, a part of the plurality of load supporting members are provided at least in the proximity of the center of the integral type neutron absorbing elements, and the margin between the support shaft of the load supporting member near the central portion and the attachment hole of the integral type neutron absorbing element is reduced to under the margin between the other load supporting members and the attachment hole, thereby increasing the load supporting ability.

The plurality of load supporting members provided closer to the central portion of heavy integral type neutron absorbing element shares the impact load and the like by a long engagement with the integral type neutron absorbing element, thereby improving the load resistance of the sheath and ensuring intervals between the integral type neutron absorbing elements.

According to the present invention, the integral type neutron absorbing element has a trap structure based on a combination of a plurality of neutron absorber plates prepared from hafnium metal or by forming a hafnium alloy made by diluting hafnium with zirconium or titanium into plates with a water gap serving as a reactor water channel, and an interval (gap) maintaining function between the neutron absorber plates to the load supporting members.

By realizing the trap structure by using neutron absorber plates made of hafnium metal or a hafnium alloy as integral type neutron absorbing elements and arranging them opposite to each other with a water gap therebetween, while maintaining the interval near the central portion, it is possible to eliminate a deflection toward inside of the neutron absorber plates, prevent a decrease in reactivity value and improve mechanical strength of the sheath.

According to the present invention, the load supporting members secured to the sheath are attached to the attachment hole of the integral type neutron absorbing element with a predetermined margin, the load supporting members are provided at an interval in a direction normal to the sheath longitudinal direction on the leading end side and on the terminal end side of insertion of the control rod in the integral type neutron absorbing element, and a margin between the support shaft of any of the load supporting members and the attachment hole of the integral type neutron absorbing element is reduced to under the margin between the other load supporting member and the attachment hole.

The load on the integral type neutron absorbing elements is certainly borne by sharing by the plurality of load supporting members in any of the inserting and withdrawing directions of the control rod, thus alleviating a local impact load of the sheath securing the load supporting members and improving the soundness of the sheath.

According to the present invention, the load supporting members secured to the sheath are attached to the attachment holes of the integral type neutron absorbing elements, and there is provided a frictional load supporting member having an interval maintaining function and a frictional resistance function between the neutron absorber plate of the integral type neutron absorbing element and the sheath.

Relative motion of the sheath and the neutron absorber plates of the integral type neutron absorbing elements along with operation of the control rod inhibits an impact load through frictional resistance between the sheath and the neutron absorber plates given by the frictional load supporting members. As a result, the burden on the load supporting members is alleviated and the soundness of the sheath is improved.

According to the present invention, the frictional resistance function of the frictional load supporting member causes engagement of a dimpling projecting into the inner surface of the sheath and a recess formed on the surface of the neutron absorber plate.

By realizing the trap structure by using neutron absorber plates made of hafnium metal or a hafnium alloy as integral type neutron absorbing elements and arranging them opposite to each other with a water gap therebetween, while maintaining an interval near the central portion, it is possible to eliminate a deflection toward inside of the neutron absorber plates, prevent a decrease in the reactivity value and improve the mechanical strength of the sheath.

According to the present invention, the load supporting members secured to the sheath are attached to the attachment hole of the integral type neutron absorbing element with a prescribed margin, the load supporting members are provided at an interval in a direction normal to the sheath longitudinal direction on the leading end side and on the terminal end side of insertion of the control rod in the integral type neutron absorbing element, and a margin between the support shaft of any of the load supporting members and the attachment hole of the integral type neutron absorbing element is reduced under the margin between the other load supporting member and the attachment hole. The load on the integral type neutron absorbing elements is certainly borne by sharing by the plurality of load supporting members in any of the inserting and withdrawing directions of the control rod, thus alleviating a local impact load of the sheath securing the load supporting members and improving the soundness of the sheath.

According to the present invention, the load supporting members secured to the sheath are attached to the attachment holes of the integral type neutron absorbing elements, and there is provided a frictional load supporting member having an interval maintaining function and a frictional resistance function between the neutron absorber plate of the integral type neutron absorbing element and the sheath. The relative motion of the sheath and the neutron absorber plates of the integral type neutron absorbing elements along with operation of the control rod inhibits an impact load through frictional resistance between the sheath and the neutron absorber plates given by the frictional load supporting members. As a result, the burden on the load supporting members is alleviated and the soundness of the sheath is improved.

According to the present invention, the frictional resistance function of the frictional load supporting member causes engagement of a dimpling projecting into the inner surface of the sheath and a recess formed on the surface of the neutron absorber plate.

By achieving engagement of the dimpling of the t sheath and the recess of the neutron absorber plate and holding this state with the frictional load supporting member, frictional resistance occurs between them.

According to the present invention, the support shaft of the load supporting member secured to the sheath is attached to the attachment hole of the integral type neutron absorbing element with a predetermined margin, and the support shaft of the load supporting member and the attachment hole of the integral type neutron absorbing element have large diameters at a specific load supporting member position from among the load supporting members, thereby improving the load supporting ability. Because of the large diameters of the attachment hole, the support shaft of the load supporting member and the sheath hole which support the impact load and the weight of the integral type neutron absorbing elements, the load bearing ability is increased and the soundness of the sheath and the like is improved.

According to the present invention, the specific load supporting member at the position of which the supporting shaft of the load supporting member and the attachment hole of the integral type neutron absorbing element have larger diameters than the others is closer to the center structural member securing the wing. In the sheath of the wing, the side secured to the center structural member has a higher mechanical strength than that on the opposite side. By causing the load supporting member closest to the center structural member to bear the load of the integral type neutron absorbing elements, the stress resistance and the mechanical strength of the sheath securing this load supporting member can be improved.

According to the present invention, the thickness of the neutron absorber is gradually reduced from the leading end side of control rod insertion toward the terminal end side, and the length of the neutron absorber is increased toward the terminal end side. Since the weight is substantially uniform for all the neutron absorber plates, the impact load borne by the individual load supporting members are substantially equalized to the load stress in the sheath, thereby improving the soundness of the sheath and the like.

According to the present invention, the length of the plurality of integral type neutron absorbing elements is reduced near the central portion of the entire length of the control rod, and a load supporting section is provided also at the central portion in the wing width direction and in the longitudinal direction of at least a part of the integral type neutron absorbing elements.

Therefore, seismic resistance is improved by increasing the attachment density of the load supporting members through reduction of the length of the integral type neutron absorbing elements at the central portion of the entire length of the control rod receiving a large stress in an earthquake. Addition of the load supporting members to the relatively heavy integral type neutron absorbing elements reduces the supported load per load supporting member, thereby improving the soundness of the sheath.

According to the present invention, the plurality of integral type neutron absorbing elements have substantially uniform lengths throughout the entire length of the control rod, and a load supporting member is provided also at the central portion in the width direction and in the longitudinal direction of the integral type neutron absorbing element up to about ⅔ length from the leading end in the control rod inserting direction. The addition of load supporting members to the relatively heavy integral type neutron absorbing elements and to the portions receiving a large stress in an earthquake reduces the supported load per load supporting member, thereby improving the soundness of the sheath.

According to the present invention, the integral type neutron absorbing element has a trap structure based on a combination of a plurality of neutron absorber plates prepared from hafnium metal or by forming a hafnium alloy made by diluting hafnium with zirconium or titanium into plates with a water gap therebetween, and neutron absorber plates having the water gap is arranged stepwise in the control rod inserting direction. The integral type neutron absorbing elements in the sheath comprise neutron absorber plates made of hafnium metal or a hafnium alloy, arranged stepwise with the water gap. The strength in the horizontal direction is therefore reinforced and the strength of the sheath is improved.

In the integral type neutron absorbing elements, there is no longitudinal gap between the neutron absorber plates, with no crossing neutrons, thus permitting improvement of reactivity value of the control rod.

According to the present invention, the integral type neutron absorbing element has a trap structure based on a combination of a plurality of neutron absorber plates prepared from hafnium metal or by forming a hafnium alloy made by diluting hafnium with zirconium or titanium into plates with a water gap and the thickness of the neutron absorber plate is gradually reduced from the leading end side of the control rod insertion toward the terminal end side thereof, the load supporting member secured to the sheath is attached to the attachment hole with a predetermined margin, two such load supporting members are each provided at an interval in the sheath longitudinal direction, and an interval maintaining member secured between the sheaths of both the surfaces at the central portion in the longitudinal direction and in the width direction between the load supporting members is provided on each of at least on set of integral type neutron absorbing elements. Since the interval maintaining member is secured between two oppositely arranged neutron absorber plates at the central portion from the load supporting member, the neutron absorbing plates become difficult to be bent, and the sheath strength is reinforced, thus improving the soundness of the sheath. An appropriate gap is kept between the neutron absorber plates arranged opposite to each other, thereby preventing a decrease in reactivity value of the control rod.

According to the present invention, at least one set of integral type neutron absorbing elements, the neutron absorber plates are made of a hafnium alloy comprising hafnium and a metal having a specific gravity smaller than that of hafnium which forms an alloy with hafnium such as zirconium or titanium, at a content of hafnium equal to that in hafnium metal, and therefore, the mechanical strength is improved by increasing thickness.

A neutron absorber plate in an integral type neutron absorbing element made of a hafnium alloy has an increased thickness as compared with hafnium metal having the same hafnium content. This increases strength and reinforces the sheath strength, resulting in the improved soundness of the sheath.

According to the present invention, the integral type neutron absorbing elements comprise neutron absorber plates formed from hafnium metal or a hafnium alloy prepared by diluting hafnium with zirconium or titanium into a plate shape, the integral type neutron absorbing elements form water passages in the control rod inserting direction in the sheath and the cross-section in a direction at an angle normal to the insertion/withdrawal direction forms substantially a box shape. Since the integral type neutron absorbing element has a substantially box-shaped cross-section, there is an increase in toughness, leading to a higher mechanical strength, and an increased sheath strength improves the soundness of the sheath. The water passages are provided on both the sides of the integral type neutron absorbing element in the sheath.

According to the present invention, a projection having the same thickness as that of the sheath is provided on a center structural member (tie rod) and the projection having a thickness equal to the wing thickness is welded together with the sheath. Welding of plates having the same thickness leads to a uniform heat input to both the plates in the welding, thus reducing welding defects such as insufficient penetration.

BRIEF DESCRIPTION OF THE DRAWINGS

In the accompanying drawings:

FIG. 1 represents a first embodiment of a control rod for a nuclear reactor according to the present invention, in which FIG. 1A is an enlarged front view of a wing, partially cut away, FIG. 1B is an enlarged front view of an Hf plate pair to be accommodated in the wing, and FIG. 1C is a sectional view taken along the line IC—IC in FIG. 1B;

FIG. 2 represents a second embodiment of a control rod for a nuclear reactor according to the present invention, in which FIG. 2A is an enlarged front view of a wing, partially cut away, FIG. 2B is an enlarged front view of an Hf plate pair to be accommodated in the wing, and FIG. 2C is a sectional view taken along the line IIC—IIC in FIG. 2B;

FIG. 3 represents a third embodiment of a control rod for a nuclear reactor according to the present invention, in which FIG. 3A is an enlarged front view of a wing, partially cut away, FIG. 3B is an enlarged front view of an Hf plate pair to be accommodated in the wing, and FIG. 3C is a sectional view taken along the line IIIC—IIIC in FIG. 3B;

FIG. 4 represents a fourth embodiment of a control rod for a nuclear reactor according to the present invention, in which

FIG. 8 represents an eighth embodiment of a control rod for a nuclear reactor according to the present invention, in which

FIG. 10 represents a tenth embodiment of a control rod for a nuclear reactor according to the present invention, in which FIG. 10A is an enlarged front view of a wing, partially cut away, FIG. 10B is a longitudinal sectional view taken along the line XB—XB in FIG. 10A, FIG. 10C is a partially enlarged sectional view of FIG. 10B, and FIG. 10D is a perspective view of a load supporting member;

FIG. 15 represents a fifteenth embodiment of a control rod for a nuclear reactor according to the present invention, in which

FIG. 19 represents a conventional long-life type control rod, in which FIG. 19A is a perspective view thereof partially cut away, FIG. 19B is a sectional view of a wing and FIG. 19C is a perspective view of a load supporting member;

FIG. 20 represents a conventional long-life type control rod, in which FIG. 21 represents a conventional long-life type control rod, in which FIG. 21A is an enlarged front view thereof partially cut away, FIG. 21B is an enlarged front view of an Hf plate pair to be accommodated in a wing and FIG. 21C is a sectional view taken along the line XXIC—XXIC in FIG. 21B.

DESCRIPTION OF THE PREFERRED EMBODIMENTS

Figure 4A:
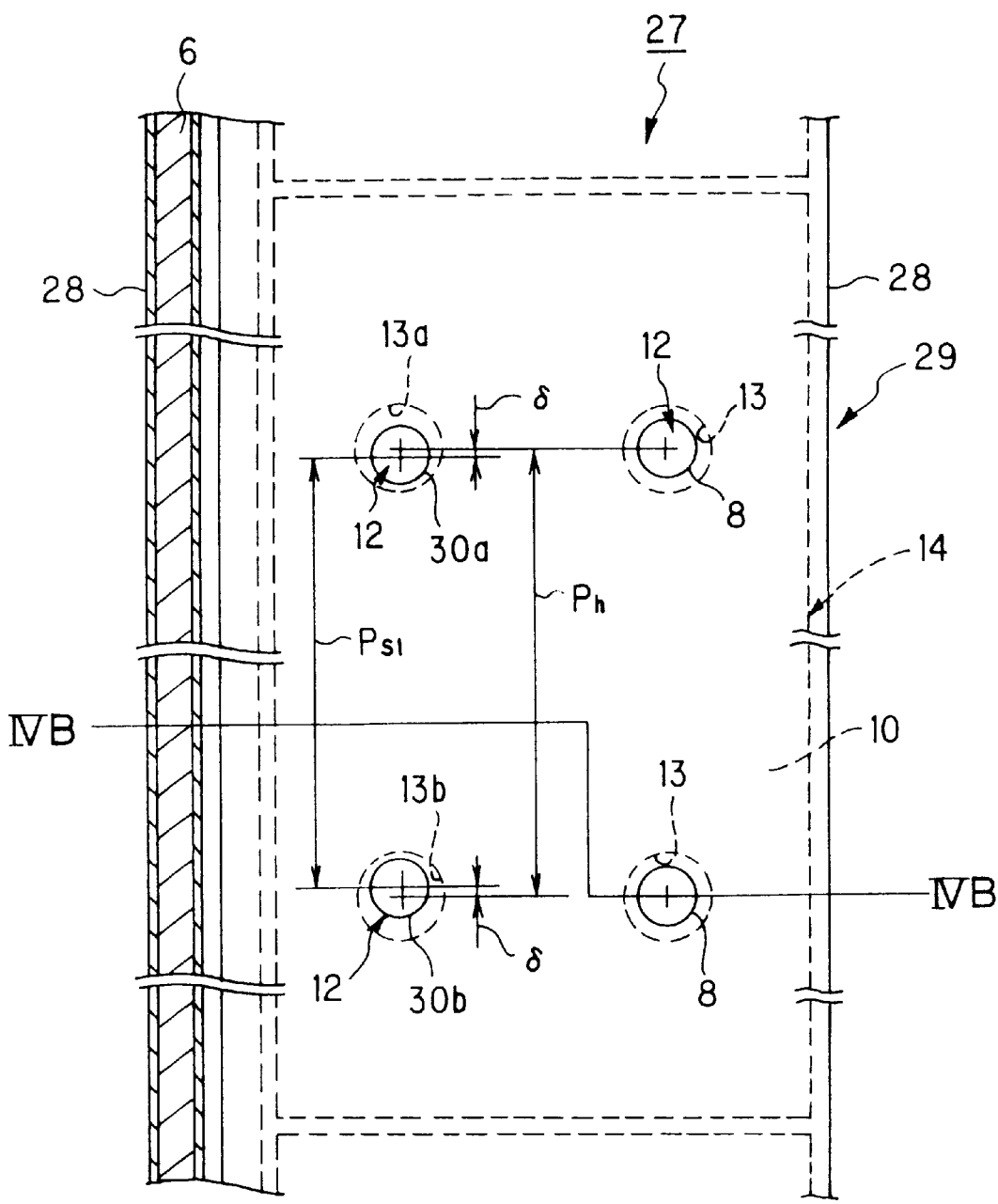
FIG. 4A is an enlarged front view of a wing and FIG. 4B is a sectional view taken along the line IVB—IVB in FIG. 4A.

Embodiments of the invention will be described hereunder with reference to the accompanying drawings. For the same members or elements as those described above regarding the conventional art are assigned with the same reference numerals and detailed description thereof is omitted here.

FIG. 1 represents a first embodiment of a control rod for a nuclear reactor of the present invention, in which FIG. 1A corresponds to FIG. 21A and FIG. 1B corresponds to FIG. 21B, respectively.

With reference to FIG. 1, in a long-life type control rod 16, a long sheath 7 made of SUS having a deep U-shaped cross-section houses a plurality of pairs, arranged in a row in a longitudinal direction, of Hf plate pairs 14 each comprising two neutron absorber Hf plates 10 as a pair, arranged opposite to each other with a water gap 11 therebetween, formed by load supporting members 12 made of SUS, serving as integral type neutron absorbing elements. These plurality of Hf plate pairs 14 form a wing 17 held by the sheath 7 via a load supporting members 12 of the character mentioned hereinbefore with reference to the conventional art.

The hafnium has a number of its isotopes each absorbs neutrons successively to cause an isotope shift, so that although a neutron absorption cross section of each isotope is smaller than that of boron, as a whole, the neutron absorption cross section is large, and when the hafnium is used as a neutron absorber, it provides a large nuclear life time, thus achieving a long life time.

A leading end structural member 4 formed integral with a handle 3 is provided at an insertion leading end of the wing 17, and a terminal end structural member 5 is provided at an insertion terminal end thereof. In the control rod 16, an opening portion of four U-shaped sheaths 7 are fitted and fixed to projecting portions in four directions of a center structural member 6 having a cross shape in horizontal (cross) section to thereby form the wing 17 having the cruciform cross section. The center structural member 6 is formed as an integral-type center structural member integrally fixed to the leading end structural member 4 and the terminal end structural member 5. An independent-type center structural member disposed with spaces in the longitudinal direction of the control rod may be used in place of the integral-type center structural member 6. In any case, the center structural member 6 constitutes a central tie rod and four wings are fixed by means of welding with an interval of the center angle of 90°.

Figures 20A, 20B:
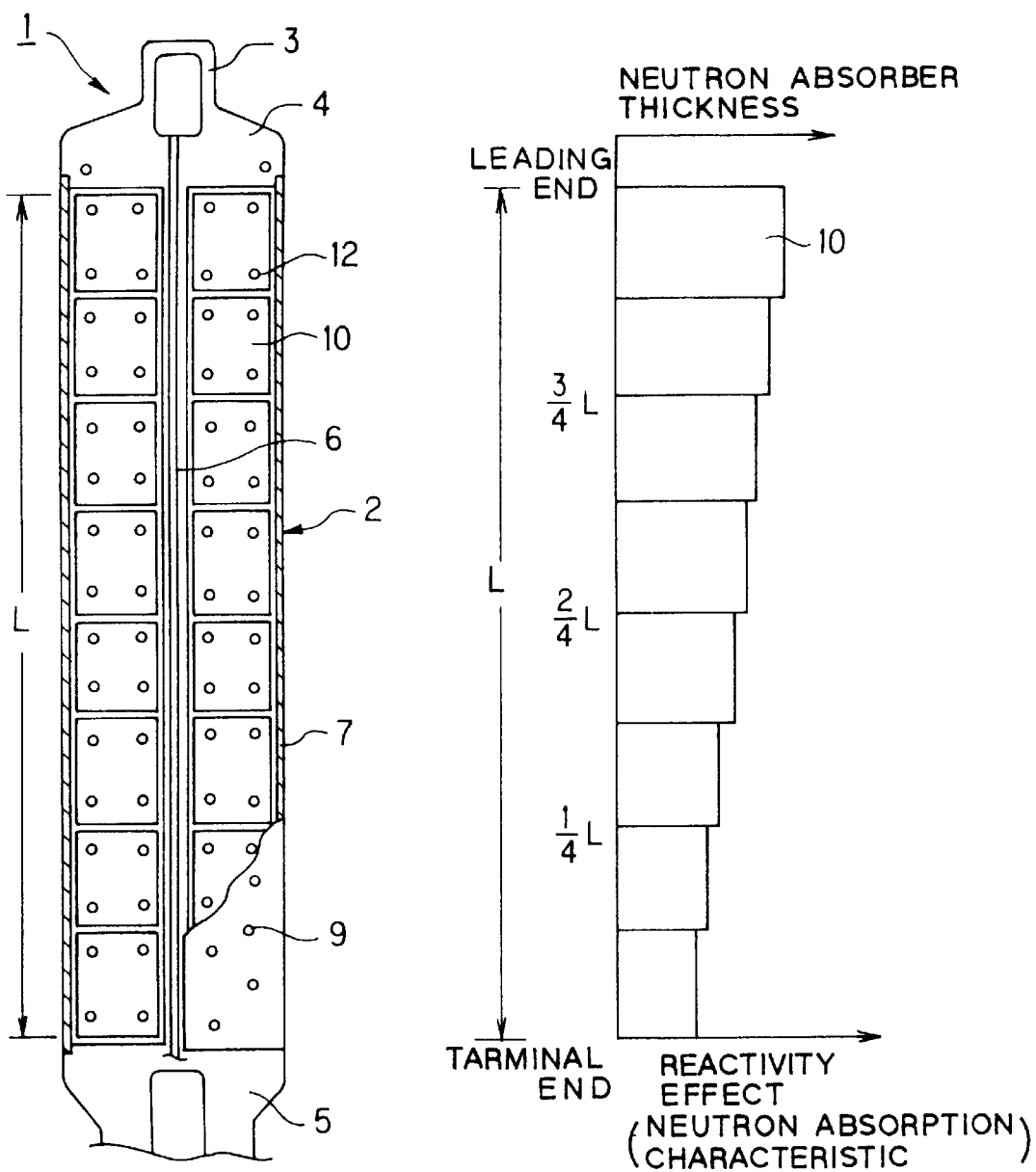
FIG. 20A is a front view of the control rod partially cut away and FIG. 20B is a diagram illustrating distribution of Hf plate thickness in the axial direction.

When the sheath longitudinal length L in the inserting direction into the reactor core is divided equally into eight sections, as in the conventional case shown in FIG. 20A, the Hf plate 10 serving as a neutron absorber plate in the integral type neutron absorbing element (neutron absorber) would have a length of about L/8. The Hf plate 10 usually comprises hafnium metal or an alloy prepared by diluting with zirconium (Zr) or titanium (Ti).

In the control rod 16, as shown in FIGS. 1A and 1B, each of the two Hf plate pairs 18 from the insertion leading end from among the plurality of Hf plate pairs 14 is divided equally into two Hf plates 10a and 10b each having a length of about 1/2. The Hf plate pairs 18 on the insertion leading end side are respectively held by four load supporting members 12 also serving as a interval maintaining spacer. More specifically, in the two pairs of Hf plates 18 on the side of the insertion leading end, one side of one Hf plate pair 18 comprises upper and lower Hf plates 10a and 10b, which is composed of four Hf plates 10a and 10b in total, arranged opposite to each other via the load supporting members 12.

As shown in FIG. 1C, the wing 17 attaches a support shaft 12b of the load supporting member 12 to each of four attachment holes 13 pierced in the Hf plates 10a and 10b arranged opposite to each other to ensure a water gap 11 by means of a central gap maintaining portion 12a.

Further, the support shaft 12b is engaged with a sheath hole (bore) 8 of the sheath 7, which are secured by means of welding to form the Hf plate pair 18. The load of these two Hf pairs 18 and the six Hf plate pairs 14 are held by the sheath 7.

The operation of the first embodiment of the control rod of the above-mentioned structure will be described below. The Hf plate 10 serving as the neutron absorber plate in the integral-type neutron absorber housed in the sheath in each wing 17 of the control rod 16 has a larger thickness on the insertion leading end side than on the insertion terminal end side.

In the conventional configuration, therefore, the load per one load supporting member 12 is larger with a local stress around the sheath hole 8 and the load bearing on the sheath 7 as compared with the insertion terminal end side.

In the two Hf plate pairs 18 on the insertion leading end side, however, since the Hf plates 10a and 10b are formed each to have a length of about 1/2 that of the Hf plates 10 of the other Hf plate pairs 14, the weight of each thereof results in a ½ weight.

In addition, the load supporting members 12 supporting the Hf plates 10a and 10b and transmitting the weight to the U-shaped sheath 7 are in a number of four, the same number of the Hf plates 10 located on the insertion terminal end side. The load bearing per one Hf plate and the local load at the U-shaped sheath 7 securing the load supporting members 12 are reduced to a half that in the conventional case, thus dispersing the local load concentrically acting on the load supporting member 12.

As a result, the mechanical strength of the control rod is improved together with that of the U-shaped sheath 7. Since the sheaths 7 arranged on both the sides of the load supporting member 12 are secured by means of welding, the mechanical and physical strength of the wing 2 as well as the sheaths 7 can be achieved, resulting in the improvement of the mechanical and physical strength of the control rod 16 by increasing the load supporting members 12.

In the above-mentioned first embodiment of the present invention, the case where only the two pairs of Hf plates 18 from the insertion leading end of the control rod 16 is equally divided into two parts in the axial direction has been described. It is however easy to change the design as to the number of Hf plate pairs 14 to be divided into Hf plate pairs 18 from the insertion leading end and as to the ratio of division in the sheath longitudinal direction.

In the control rod 16 for the nuclear reactor, it is possible to design it by selecting optimum conditions by taking account of the thickness associated with the weight of the Hf plates 10, thickness associated with mechanical and physical strength of the sheath 7, period of use and anticipated number of scrams, the anticipated intensity and number of earthquakes.

For example, when it is divided into eight sections in the axial direction as shown in FIG. 20B, the first embodiment of the present invention covers a method of dividing up to five pairs from the insertion leading end being equally divided into six to seven. In view of the fact that, with a length longer than a half of the total length, stress in an earthquake or the like tends to be maximum near the central portion relative to the total length of the control rod 16, it is possible to select a construction capable of withstanding a stress such as an earthquake by improving the mechanical and physical strength at a portion near the central portion thereof.

In the wing 17 of the control rod 16 shown in FIGS. 1A and 1C, the short Hf plate pair 18 are lodged on the insertion leading end side and the long Hf plate pair 14 having a length longer than the Hf plate pair 18 are lodged on the insertion terminal end side. The interval between the two Hf plates 10a, 10b of the Hf plate pair 18 is maintained by the interval maintaining portion 12a of the load supporting member 12 to thereby ensure the water gap (cooling water passage) 11. The load supporting member 12 has both side support shafts 12b which penetrate attachment holes 13 of the Hf plates 10a and fitted to sheath holes 8 of the U-shaped sheath 7 and then fixed by means of welding.

The thickness of the gap portion 12a of the load supporting member 12 should be sufficient to maintain a water gap 11 between two Hf plates 10a and 10a arranged opposite to each other and to achieve a satisfactory strength of the sheath 7, thus forming a control rod of the trap construction.

A margin should be provided between the support shaft 12b of the load supporting member 12 and the attachment hole 13 of the Hf plate 10a so that a difference in thermal expansion between the load supporting member 12 made of SUS and the Hf plate 10a does not impair mutual thermal expansion. The diameter of the attachment hole 13 should be larger than the diameter of the support shaft 12b. The thermal expansion and thermal contraction in the heat cycle in the reactor operation are repeated and the thermal expansion difference is caused by the formation of the wing 17 of the control rod 16 by several different materials. However, according to the control rod of this embodiment, since a margin is maintained in the attachment hole 13 to which the support shaft 12b of the load supporting member 12 is loosely fitted, it is possible to eliminate an adverse effect of stress caused by the difference in thermal expansion.

Further, when urgently inserting the control rod 16 into the reactor core in a reactor scram or the like, an impact is exerted onto the support shaft 12b of the load supporting member 12 which supports the integral type neutron absorber Hf plate and then transmitted to the sheath 7. If the strength of the sheath 7 is insufficient, there may occur a trouble in soundness of the sheath 7.

On the insertion leading end side where the load bearing per load supporting member 12 is conventionally large, however, load bearing of the load supporting member 12 and local load onto the sheath 7 are largely alleviated in the invention, thus permitting improvement of soundness.

Because the possibility of the occurrence of the trouble depends also upon the extent of impact onto the control rod and the number of impacts, a particularly remarkable effect can be achieved in a long-life type control rod used for a longer period of time in the nuclear reactor.

In the above-mentioned first embodiment of the invention, the control rod 16 of the trap type structure in which two Hf plates 10 are arranged opposite to each other with the water gap 11 has been presented. The described functions and effects are not limited to the control rod of the trap structure. This is also the case with the second and subsequent embodiments of the present invention which will be described hereinlater.

FIG. 2 represents the second embodiment, in which FIG. 2 is a partially cutaway enlarged front view, FIG. 2B is an enlarged front view of an Hf plate pair and FIG. 2C is a sectional view of FIG. 2B taken along the line IIC—IIC, and FIG. 2A to 2C corresponds to FIGS. 1A to 1C illustrating the first embodiment.

Therefore, in the following description, only the difference of the second embodiment from the first embodiment will be mainly described. For the other structures, since the functions and effects are the same as in the first embodiment, description thereof is omitted here.

In the control rod 19, as shown in FIG. 2A, from among the plurality of Hf plate pairs 14 serving as neutron absorber plates in the integral type neutron absorber forming a wing 20, the two Hf plate pairs 21 from the insertion leading end are equally divided into two in the width (w) direction at right angles to the sheath longitudinal direction, and the Hf plates 10c and 10d having a width of about w/2 are held by the sheath 7 via the four load supporting members 12, respectively.

More specifically, as shown in FIG. 2B, the two Hf plate pairs from the insertion leading end comprise four Hf plates 10c and 10d in total, arranged opposite to each other via the load supporting members 12, one Hf plate pair 21 comprising right and left Hf plates 10c and 10d on one side, and the water gap 11 is formed between the Hf plates 10c, 10c (10d, 10d) to maintain the interval therebetween.

The wing 20 comprises, as shown in FIG. 2C, the Hf plates 10c and 10c arranged opposite to each other and the support shafts 12b of the load supporting members 12 penetrating the four attachment holes 13 pierced in the Hf plates 10d and 10d and fitted to the sheath holes 8 of the U-shaped sheath to thereby maintain a water gap 11 by means of the gap (interval) maintaining portion 12a.

Further, the weight of the two Hf plate pairs 21 is held, together with the six Hf plate pairs 14, by the sheath 7 by engaging the support shaft 12b with the sheath hole 8 of the U-shaped sheath 7 and securing the same by means of welding.

With the control rod 19, when dividing the Hf plate 10 in the width direction into a plurality of Hf plates 10c and 10d, the outer Hf plate 10d is made thicker and the Hf plate 10c on the integral type center structural member 6 is made thinner because the outer edge of the wing 20 is more important from the point of view of reactivity of neutron absorption, and the amount of neutron irradiation is increased.

The second embodiment includes another example which covers a structure in which an Hf bar serving as a bar-shaped integral type neutron absorbing element not shown is inserted between the inner wall of the U-shaped sheath 7 and the Hf plate 10d, on the outermost edge of the wing 20 in the control rod 19 shown in FIG. 2.

The control rod 19 having the structure mentioned above will operate as follows.

The Hf plate 10 serving as a neutron absorber plate in the Hf plate pair 14 in the proximity of the insertion leading end is thick and therefore heavy. In this Hf plate pair 21, the Hf plates 10c and 10d having a width of w/2 relative to the width w in a direction at right angles to the inserting/withdrawing direction of the control rod are supported by the four load supporting members 12, respectively.

As a result, as in the first embodiment described above, there would be eight load supporting members 12 for the Hf plate pair 21, twice as many. The weight and impact load borne by a single load supporting member are reduced to a half. The supporting ability of the load supporting member 12 in the Hf plate pair 21 is therefore doubled as compared with the supporting ability of the load supporting members 12 in the Hf plate pair 14 located on the terminal end side.

Because the Hf plate 10d on the outer edge of the wing 20 exposed to the most serious neutron irradiation is made thicker than the Hf plate 10c on the side of the integral type center structural member 6, a remarkable reactivity effect can be attained in the neutron absorption.

As a result, a high reactivity value of the control rod is obtained with the same quantity of Hf, contributing also to improvement of the strength of the control rod. That is, outside the wing having a lower mechanical strength than that of the integral type center structural member 6, the Hf plate 10d is made thicker with a width not exceeding w/2, and load supporting members 12 in the same number are attached.

It is possible from this result to improve the strength by means of the Hf plates 10c and 10d and to improve the strength and the reactivity value by means of the load supporting members 12. When it is not necessary to improve reactivity value, the Hf plate 10 may be thinner. It is therefore possible to alleviate the impact load onto the sheath 7 through the load supporting members 12 under the effect of weight reduction, thus permitting further improvement of the soundness of the sheath 7 and mechanical strength of the control rod 19.

In a further example, an Hf bar provided on the outer edge of the wing 20 in the control rod 19 may increase the neutron absorbing ability per unit length in the width direction as compared with the other portions, which brings about the effects of reducing the width of each Hf plate 10 as in the above example to reduce the weight and of improving the mechanical strength of the sheath 7 on the outermost edge of the wing 20 from the Hf bar, thus permitting further improvement of the soundness of the sheath 7 and the strength of the control rod 19.

FIG. 3 represents the third embodiment of the present invention, in which FIG. 3A is a partially cutaway enlarged front view, FIG. 3B is an enlarged front view of an Hf plate pair and FIG. 3C is a sectional view of FIG. 3B taken along the line IIIC—IIIC.

FIGS. 3A to 3C correspond to FIGS. 2A to 2C illustrating the second embodiment. The following description of the third embodiment will only describe the different structures or the like from the second embodiment. For the other structure or construction, the functions and effects are substantially the same as in the first and the second embodiments described above, and the description thereof is omitted here.

In the control rod 22, as shown in FIG. 3A, from among the plurality of Hf plate pairs 14 serving as integral neutron absorbing elements forming the wing 23, the two Hf plate pairs 24 from the insertion leading end into the reactor core are equally divided into two in the width (w) direction at right angles to the sheath longitudinal direction, and the Hf plates 10c and 10d having a width of about w/2 are held by the U-shaped sheath 7 through the four load supporting members 12, respectively.

As shown in FIGS. 3B and 3C, a wider space than that in the second embodiment described above is provided between the Hf plates 10c and 10d arranged in the width direction in the same wing 23 in the Hf plate pair 24.

An Hf bar 25 serving as a neutron absorber is inserted into this wide space and a stiffener 26 (containing a neutron absorber) comprising a special tube having ridges projecting every 90° of the outer periphery is arranged. This stiffener 26 is secured by means of welding to the sheathes 7 on both the sides at the projecting ridges.

In this configuration, both the sides of the long sheath 7 having a deep U-shaped cross-section are linearly secured through the location of the stiffener 26 inside substantially at the intermediate portion thereof, thus remarkably improving the mechanical strength as the wing 23 together with the sheath 7. Under the effect of the Hf bar 25 and the like inserted into the stiffener 26, the reactivity value as the control rod 22 does not almost decrease.

The same functions and effects as those of the second embodiment can be attained by making the Hf plate 10d on the outer side in the width direction of the wing 23 in the U-shaped sheath 7 thicker than the Hf plate 10c on the integral type center structural member 6.

Figure 4B:
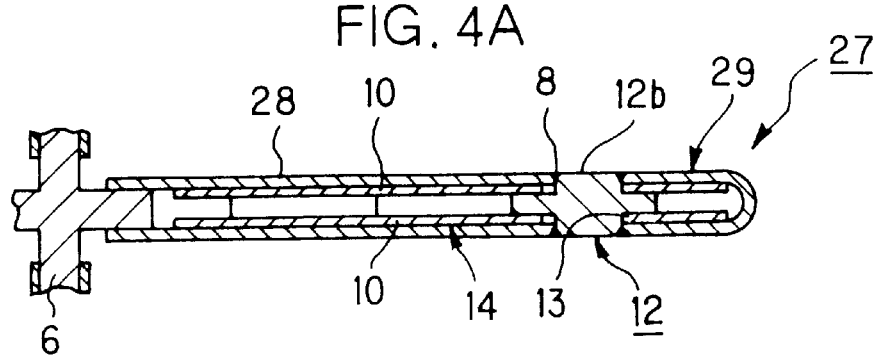

FIG. 4 represents the fourth embodiment of the control rod of the present invention, in which FIG. 4A is an enlarged front view of a wing, partially cut away, and FIG. 4B is a sectional view taken along the line IVB—IVB in FIG. 4A.

In the control rod 27, a long sheath 28 made of SUS having a deep U-shaped cross-section houses a plurality of sets of Hf plate pairs 14 each comprising two long-life type neutron absorber Hf plates 10 arranged opposite to each other with a water gap 11 formed by the load supporting member 12 made of SUS, which serve as an integral type neutron absorbing elements. The plurality of Hf plate pairs 14, the load of which is supported by the U-shaped sheath 28 through the load supporting members 12, form a wing 29 of the control rod 27.

With this control rod 27, a leading end structural member 4 integral with a handle and a terminal end structural member 5 are provided at the insertion leading end and the terminal end into the reactor core of the wing 29, respectively, and the openings of the U-shaped sheathes 28 in these four wings 29 engage with projections projecting in four directions each forming an angle of 90° with the adjacent ones of the integral type center structural members 6 and secured thereto, thus the control rod 29 providing a cruciform cross-section.

In the control rod 27 of this embodiment, the Hf plate 10 is accommodated in the wing 29 and the Hf plate 10 is mounted to the U-shaped sheath 28 by means of the load supporting member 12 to thereby support the same.

A pitch Ps1 in the sheath longitudinal direction which is the insertion/withdrawal direction into the reactor core, of sheath holes 30a and 30b pierced in the sheath 28 engaging with, and secured to, the support shaft 12b of the load supporting member 12 on the integral center structural member 6 side of the wing 29 are prepared into sizes shorter by 2 times (2δ) where δ is a shift exceeding the range of manufacturing tolerance, than a pitch Ph of attachment holes 13, 13a and 13b pierced in the Hf plate 10 and the sheath 28 on the side of the wing width direction.

That is, in the control rod 27, the central axis of the sheath hole 30a of the U-shaped sheath 28 is shifted by δ downward relative to the upper attachment hole 13a, and the central axis of the sheath hole 30b thereof is shifted by δ upward relative to the lower attachment hole 13b.

As a result, the support shaft 12b of the load supporting member 12 engaging with and secured to the sheath holes 30a and 30b on the side of the integral type center structural member 6 (inside the wing width direction of the wing 29) and the attachment holes 13a and 13b of the Hf plate 10 to be inserted and fitted thereto are arranged eccentrically.

According to such eccentric support manner, large gaps are hence produced above the upper attachment hole 13a and below the lower attachment hole 13b, and on the other hand, the gaps below the upper attachment hole 13a on the opposite side and above the lower attachment hole 13b become smaller.

By providing a gap by making the diameter of the attachment hole 13 of the Hf plate 10 larger than the diameter of the support shaft 12b of the load supporting member 12, a margin is provided so that there occurs no trouble of interference and unnecessary stress caused by a difference in the thermal expansion between the load supporting member 12 and the Hf plate 10 resulting from the difference in the thermal expansion due to the difference of the materials along with the heat cycle of the nuclear reactor operation.

The control rod 27 of the fourth embodiment having the structure mentioned above will operate as follows.

Upon a rapid driving or stoppage of the control rod, there may cause a case where an impact load is applied, in addition to the weight of the Hf plate, to the U-shaped sheath 28 through the load supporting member 12.

When the attachment hole 13 of the Hf plate 10 and the sheath longitudinal pitch Ph of the sheath hole 8 of the U-shaped sheath 28 are equal in size, as in a conventional case, even if a margin is provided taking account of the difference in expansion, vertical displacement of the Hf plate prepared within a range of manufacturing tolerance would cause, in the worst case, a not-specified particular one load supporting member 12 to receive stress. Because of this reason, in the U-shaped sheath 28, there may cause an adverse case in which a large stress is concentrically applied to a portion near the sheath hole 8 securing that load supporting member 12.

In the control rod 27 shown in FIG. 4, however, the impact load, which is generated when the Hf plate 10 relatively displaces by an inertia upward, i.e. in the inserting direction of the control rod, is such that, in the control rod leading end direction (upward) of the Hf plate 10, the lower edge of the attachment hole 13a on the integral type center structural member 6 side comes into contact with the lower portion of the supporting shaft 12b of the load supporting member 12 having a small gap, but there is only a small impact load because the distance of inertia displacement is short.

As a result, a relatively small stress occurs near the sheath hole 30a of the sheath 28 to which the load supporting member 12 is secured. However, no stress occurs at the sheath hole 30b on the side of the integral type center structural member 6 in the other control rod terminal end direction (downward) or near the sheath hole 8 on the outer side of the wing width direction.

When the Hf plate 10 is inertia-displaced in the downward direction, i.e. in the terminal end direction of the control rod, the upper edge of the attachment hole 13b on the side of the integral type center structural member 6 comes into contact, in the control rod terminal direction (downward) of the Hf plate 10, with the upper portion of the support shaft 12b of the load supporting member 12 with a small gap, and a relatively small impact load is then applied.

As a result, a relatively small stress occurs near the sheath hole 30b of the sheath 28, whereas no unnecessary stress is generated on the sheath 28 near the other three sheath holes 8 and 30a, and the stress is dispersed.

It is considered appropriate to use a shift amount of δ within a range of from 0.5 to 1.5 mm, exceeding the overall manufacturing tolerance of, for example, 0.5 mm.

In the control rod 27 of this embodiment, the sheath longitudinal pitch Ps1 of the sheath holes 30a and 30b is slightly shifted from the pitch Ph of the sheath hole 8 and the attachment holes 13, 13a and 13b to set the stress generating place along with the inertia-displacement of the Hf plate 10 on the side of the integral type center structural member 6.

The reason is as follows. In the long sheath 28 having a deep U-shaped cross-section, the side secured to the integral type center structural member 6 has a higher mechanical strength in general than the side apart from the integral type center structural member 6. This may however be accomplished for the sheath hole 8 on the side far from the integral type center structural member 6, with the same functions and effects.

In this fourth embodiment, furthermore, it is possible to specify two load supporting members 12 in the Hf plate pair 14 to receive a local impact load applied onto the sheath 28 upon relative movement by the inertia of the Hf plate 10 in relation to the insertion/withdrawal operation of the control rod 27 into and from the reactor core.

Consequently, it is possible to take countermeasures such as a local reinforcement or administration of the manufacturing tolerance with due regard to the attachment hole 13 of the Hf plate 10 of the load supporting member 12, the proximity thereof and the sheath 28, thus permitting further extension of service life of a long-life type control rod.

Furthermore, an impact load can be shared certainly by two points, not by one point, and the soundness and reliability of the sheath 28 and the control rod 27 can be also improved by selecting an appropriate size of the shift amount δ.

Figure 5:
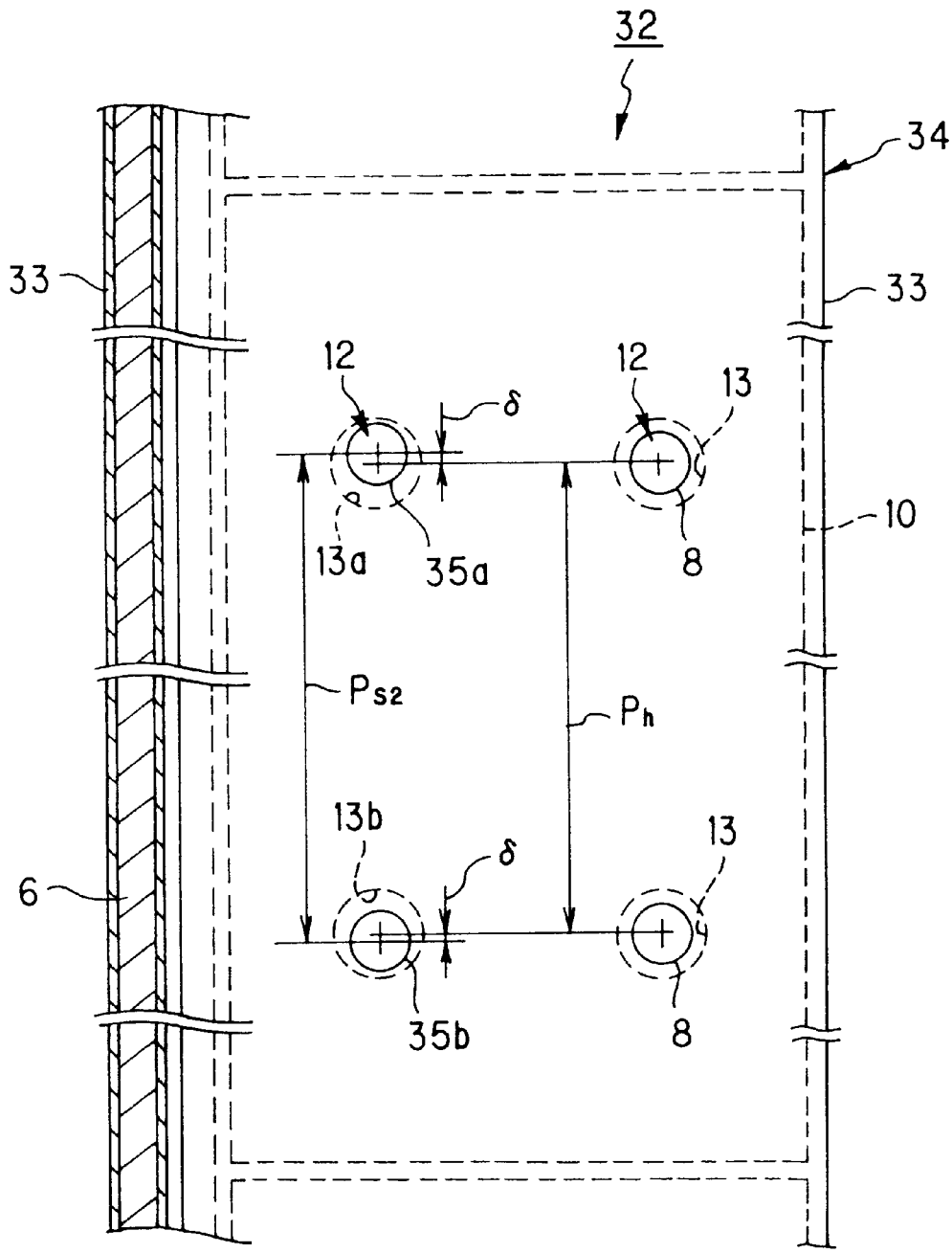
FIG. 5 represents a fifth embodiment of a control rod for a nuclear reactor according to the present invention and shows an enlarged front view of a wing.

FIG. 5 represents the fifth embodiment of the control rod of the present invention, showing an enlarged front view of the wing.

A control rod 32 of this fifth embodiment has substantially the same structure as that of the foregoing fourth embodiment, but differs from the fourth embodiment in that, while, from among the attachment holes 13, 13a and 13b in the Hf plate 10, the sheath longitudinal direction which is the insertion/withdrawal direction of the control rod into and from the reactor core is set as the pitch Ph, and the pitch Ps2 of the sheath holes 35a and 35b engaging with and securing to the support shaft 12b of the load supporting member 12 on the side of the integral type center structural member 6 of the sheath 33 is longer by 2 times (2δ) where δ is a shift amount within a range exceeding the manufacturing tolerance, than the pitch Ph.

More specifically, the sheath hole 35a is shifted by δ above the upper attachment hole 13a, and the sheath bore 35b of the U-shaped sheath 33 is shifted by δ below the lower attachment hole 13b, respectively.

According to this arrangement, there is a large gap between the support shaft 12b of the load supporting member 12 fitted to the sheath holes 35a and 35b on the side of the integral type center structural member 6 and the attachment holes 13a and 13b of the Hf plate 10 to be secured thereto, below the upper attachment hole 13a and above the lower attachment hole 13b.

In the structure described above, the support shaft 12b of the load supporting member 12 on the side of the integral type center structural member 6 is shifted by δ toward the leading end side on the insertion leading end of the control rod 32 and by δ toward the terminal end side on the insertion terminal end, relative to the pitch Ph of the attachment holes 13a and 13b of the Hf plate 10.

When the Hf plate 10 displaces by the inertia in a relatively upward direction and, therefore, an impact load is applied to the U-shaped sheath 33 from the support shaft 12b of the lower load supporting member 12 through the sheath hole 35b of the sheath 33, and when the Hf plate 10 displaces by the inertia downward, the impact load is applied to the sheath 33 from the upper support shaft 12b through the sheath hole 35a.

There occurs no stress to the sheath 33 near the other three sheath holes 8, 35a and 35, but the stress is dispersed as mentioned with reference to the fourth embodiment, and the other functions and effects are also the same as those attained by the fourth embodiment.

Figure 6:
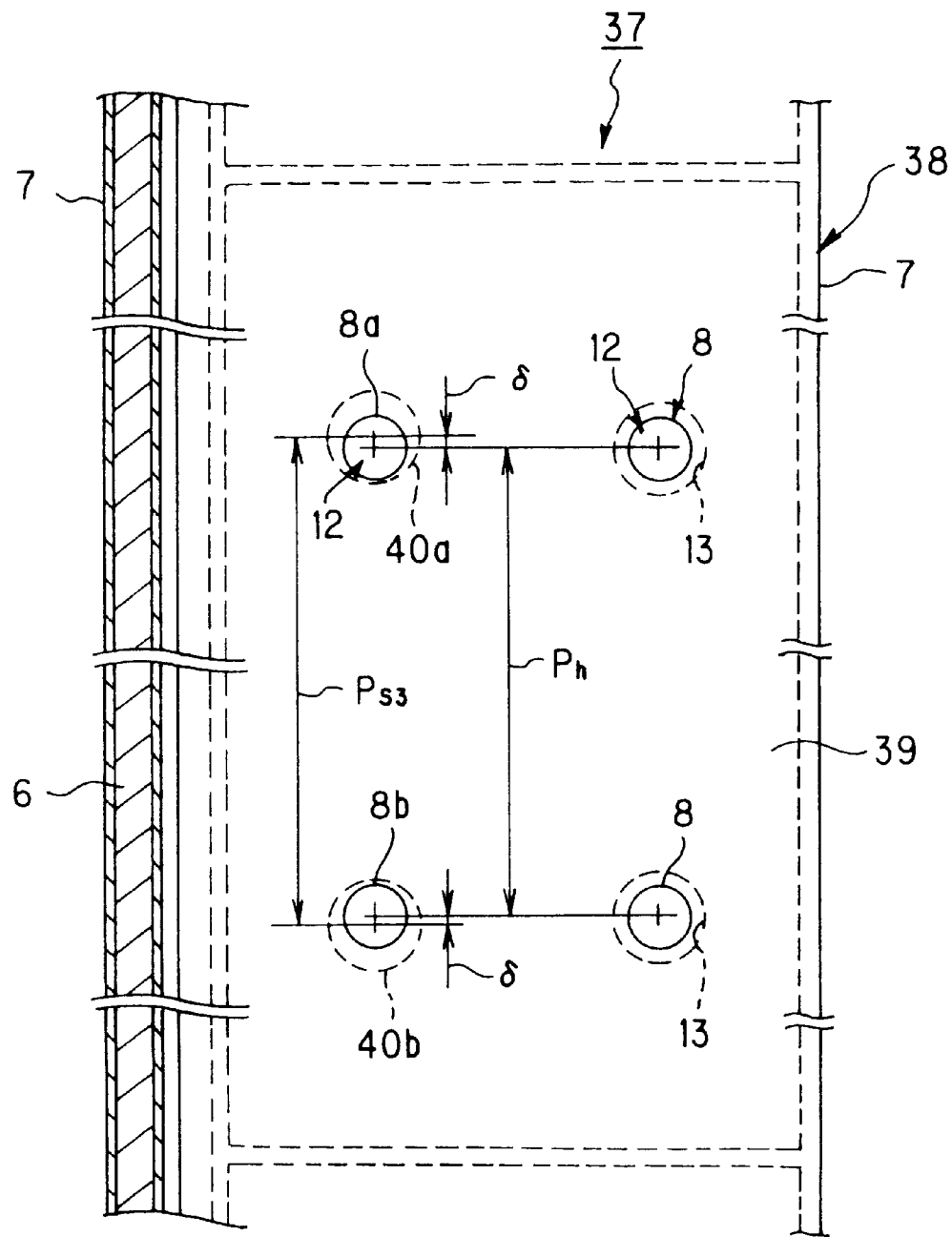
FIG. 6 represents a sixth embodiment of a control rod for a nuclear reactor according to the present invention and shows an enlarged front view of a wing.

FIG. 6 represents a sixth embodiment of the control rod of the present invention, showing an enlarged front view of the wing.

A control rod 37 of in FIG. 6 has substantially the same structure as that of the fourth embodiment, but it is different from the fourth embodiment in that the pitch between the sheath holes 8a and 8b on the side of the integral type center structural member 6 in the sheath 7 of the wing 38 is set as pitch Ph in the sheath longitudinal direction, i.e. control rod insertion/withdrawal direction into or from the reactor core.

For an Hf plate 39, in contrast, the attachment holes 40a and 40b to be fitted to the support shaft 12b of the load supporting member 12 on the integral type center structural member 6 side are configured to have a pitch Ps3 elongated by 2 times (2δ) where δ is a shift amount within a range exceeding the manufacturing tolerance so that the attachment hole 40a is shifted toward the insertion leading end of the control rod 37, and the attachment hole 40b, toward the insertion terminal end.

More specifically, the attachment hole 40a is shifted by δ upward relative to the upper sheath hole, and the attachment hole 40b, downward relative to the lower sheath hole.

As a result, there is a large gap between the support shaft 12b of the load supporting member 12 secured to the sheath holes 8a and 8b on the integral type center structural member 6 side and the attachment holes 40a and 40b of the Hf plate 39 to be secured thereto, above the upper attachment hole 40a and below the lower attachment hole 40b, as in the above-mentioned fourth embodiment.

In the structure described above, as in the fourth embodiment, upon upward relative inertia displacement of the Hf plate 39, the lower edge of the upper attachment hole 40a comes into contact with the lower portion of the support shaft 12b of the upper load supporting member 12, so that an impact load is applied to the U-shaped sheath 7 through the sheath hole 8a.

Upon the downward inertial displacement of the Hf plate 10, the upper edge of the lower attachment hole 40b comes into contact with the upper portion of the support shaft 12b of the lower load support member 12, so that the impact load is applied from the supporting shaft 12b to the U-shaped sheath 7 through the sheath hole 8b.

Consequently, a stress is produced near the sheath holes 8a and 8b of the U-shaped sheath 7, and no stress occurs near the other three sheath bores 8, 8a and 8b. According to this sixth embodiment, substantially the same functions and effects as those of the fourth embodiment will be attained.

Figure 7:
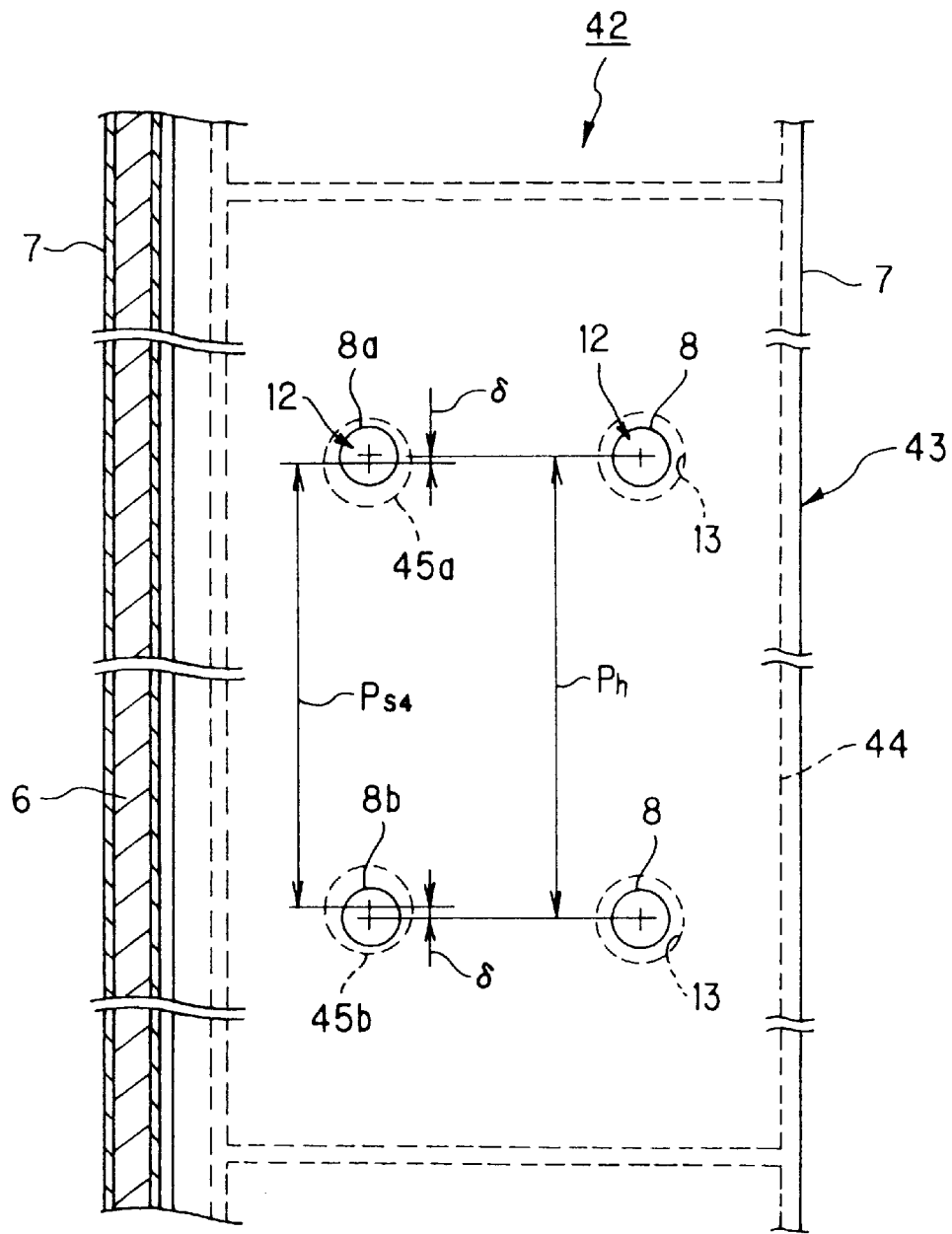
FIG. 7 represents a seventh embodiment of a control rod for a nuclear reactor according to the present invention and shows an enlarged front view of a wing.

FIG. 7 represents the seventh embodiment of the control rod of the present invention, showing an enlarged front view of a wing partially cut away.

A control rod 42 of the seventh embodiment has substantially the same arrangement as that of the sixth embodiment mentioned above, but differs from the sixth embodiment in that the pitch between the sheath holes 8a and 8b on the side of the integral type center structural member 6 in the U-shaped sheath 7 of the wing 43 is set as a pitch Ph in the sheath longitudinal direction which is the control rod insertion/withdrawal direction of the control rod into and from the reactor core.

For a neutron absorber Hf plate 44 in the integral type neutron absorbing element, in contrast, from among the attachment holes 45a and 45b attached to the supporting shaft 12b of the load supporting member 12 on the integral type center structural member 6 side, the attachment 45a is formed with a pitch Ps4 reduced by 2 times (2δ) where δ is a shift amount within a range exceeding the manufacturing tolerance, in the insertion terminal end direction of the control rod 42, and the attachment hole 45b, in the insertion leading end direction.

According to this arrangement, the attachment hole 45a is shifted by δ downward relative to the upper sheath hole 8a, and the attachment hole 45b, upward relative to the lower sheath hole 8b. As a result, there is a large gap between the supporting shaft 12b of the load supporting member 12 secured to the sheath holes 8a and 8b on the side of the integral type center structural member 6 and the attachment holes 45a and 45b of the Hf plate 40 to be secured thereto, below the upper attachment holes 45a and above the lower attachment hole 45b, as in the fifth embodiment mentioned above.

According to the structure mentioned above as functions, when the neutron absorber Hf plate 44 in the integral type neutron absorbing element relatively displaces upward by inertia, the lower portion of the supporting shaft 12b of the lower load supporting member 12 comes into contact with the lower edge of the attachment hole 45b. When the Hf plate 44 displaces downward by inertia, an impact load is applied to the sheath 7 through the sheath hole 8b and when the Hf plate displaces downward, the upper portion of the support shaft 12b of the lower load supporting member 12 comes into contact with the upper edge of the attachment hole 45a through the sheath holes 8a and 8b, respectively.

Accordingly, a stress is generated near the sheath holes 8a and 8b of the U-shaped sheath 7. The other functions and effects are substantially the same as those of the fourth and fifth embodiments described above.

Figure 8A:
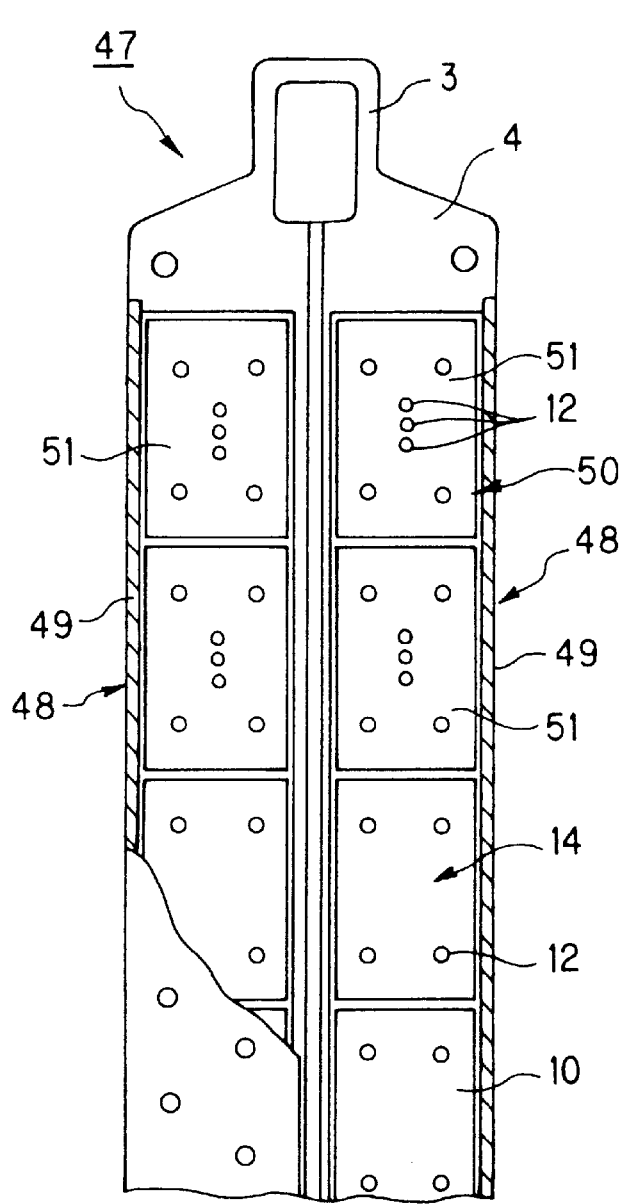
FIG. 8A shows an enlarged front view of a wing, partially cut away.
Figure 8B:
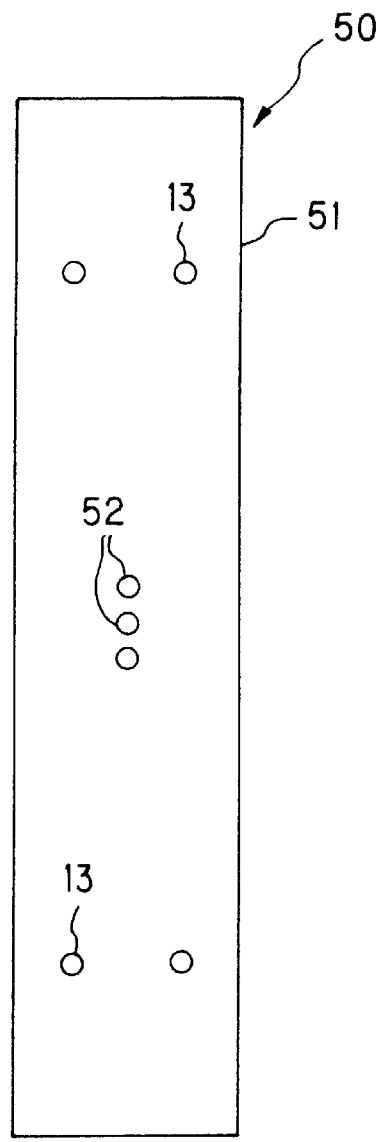
FIG. 8B is an enlarged front view of an Hf plate.

FIG. 8 represents an eighth embodiment of the control rod of the present invention, in which FIG. 8A is an enlarged front view of an Hf plate partially cut away and FIG. 8B is an enlarged front view of an Hf plate. FIG. 8A corresponds to FIG. 21A illustrating the conventional case, and FIG. 8B corresponds to FIG. 21B. Only differences therebetween will therefore be described hereunder.

As shown in FIG. 8A, a control rod 47 of this embodiment includes four wings 48 each having a sheath 49 housing a plurality of Hf plate pairs 14, supported by four load supporting members 12, with two long-life type neutron absorber Hf plates 10 serving as integral type neutron absorbing elements. In two Hf plate pairs 50 from the insertion leading end side of the control rod 47, three load supporting members 12 are provided in the longitudinal direction near the central portions in the width direction and the longitudinal direction.

As shown in FIG. 8B, therefore, the Hf plate 51 in the Hf plate pair 50 has three attachment holes 52 pierced in the longitudinal direction thereof in a row adjacent to each other near the central portions in the width direction and the longitudinal direction, in addition to four attachment holes 13 separated in the width direction and the longitudinal direction as in the conventional case.

A gap sufficient to allow avoidance of a trouble caused by a difference in thermal expansion is provided between the diameter of the four attachment holes 13 of each of the Hf plates 51 and the diameter of the support shaft 12b of the load supporting member 12. For the diameter of the three mutually adjacent attachment holes 52 near the central portion, a small gap is provided for the support shaft 12b of the load supporting member 12.

Further, long-life type neutron absorber plates made of hafnium metal or a hafnium alloy prepared by diluting hafnium with a diluting agent such as zirconium or titanium are employed as the integral type neutron absorbing elements in the Hf plates 10 and 51. The paired Hf plates 10 and 51 constituting the respective Hf plates 14 and 50 are maintained with intervals by an interval maintaining function provided for the load supporting member 12, and a water gap 11 as a passage for core water is formed in the control rod 47. The control rod 47 of this embodiment has a trap structure formed in combination of a plurality of Hf plates 10 and 51.

The operation of the control rod 47 of this embodiment will be described hereunder.

The functions of the four attachment holes 13 on the insertion leading end side and the terminal end side in the Hf plate 51 of the Hf plate pair 50 are substantially the same as those mentioned above with reference to the former embodiment. However, for the three attachment holes 52 provided adjacent to each other near the central portion thereof, the attachment hole 52 and the fitted support shaft 12b of the load supporting member 12 are arranged adjacent to each other.

Because a trouble caused by the difference in thermal expansion between the sheath made of SUS held in the three load supporting members 12 and the Hf plate 51 is of the negligible order, a relative movement resulting from a difference in the thermal expansion between the Hf plate 51 and the U-shaped sheath 49 does not occur near the central portion, but a relative movement is allowed in the insertion leading end direction and the terminal end direction.

The three load supporting members 12 provided near the central portion of each Hf plate 50 on the insertion end side of the control rod 47 and the U-shaped sheath 49 are connected on a line extending in the longitudinal direction, and therefore, the U-shaped sheath 49 can withstand a strong force. Accordingly, the appropriate range of the Hf plate pair 51 attached to the load supporting member 12 near the central portion is about ⅔ of the total length from the insertion leading end side at least for a portion at which the weight of the Hf plate 51 per one pair is largest.

Since production of the maximum stress upon an earthquake is anticipated near the central portion of the total length of the control rod 47, further effect of improving strength of the control rod 47 will be achieved by applying the present invention also for the portion near the central portion.

It is not necessary to limit, to three, the number of the attachment holes 52 held by the sheath 49 through the load supporting member 12 provided near the central portion in the rectangular Hf plate 51 of the control rod 47, and it is important to extend over the connecting line with the U-shaped sheath 49 through the load supporting member 12 by the attachment hole 13 in the conventional case.

By providing a gap (interval) maintaining function similar to that for the gap portion 12a of the load supporting member 12 as shown in FIG. 19C in at least one of the load supporting members 12 provided near the central portion, it is possible to more appropriately hold the gap between the plurality of Hf plates 51 arranged opposite to each other. It is therefore possible to prevent fluctuation of the reactivity value of the control rod caused by deflection of the Hf plates 51.

Figure 9:
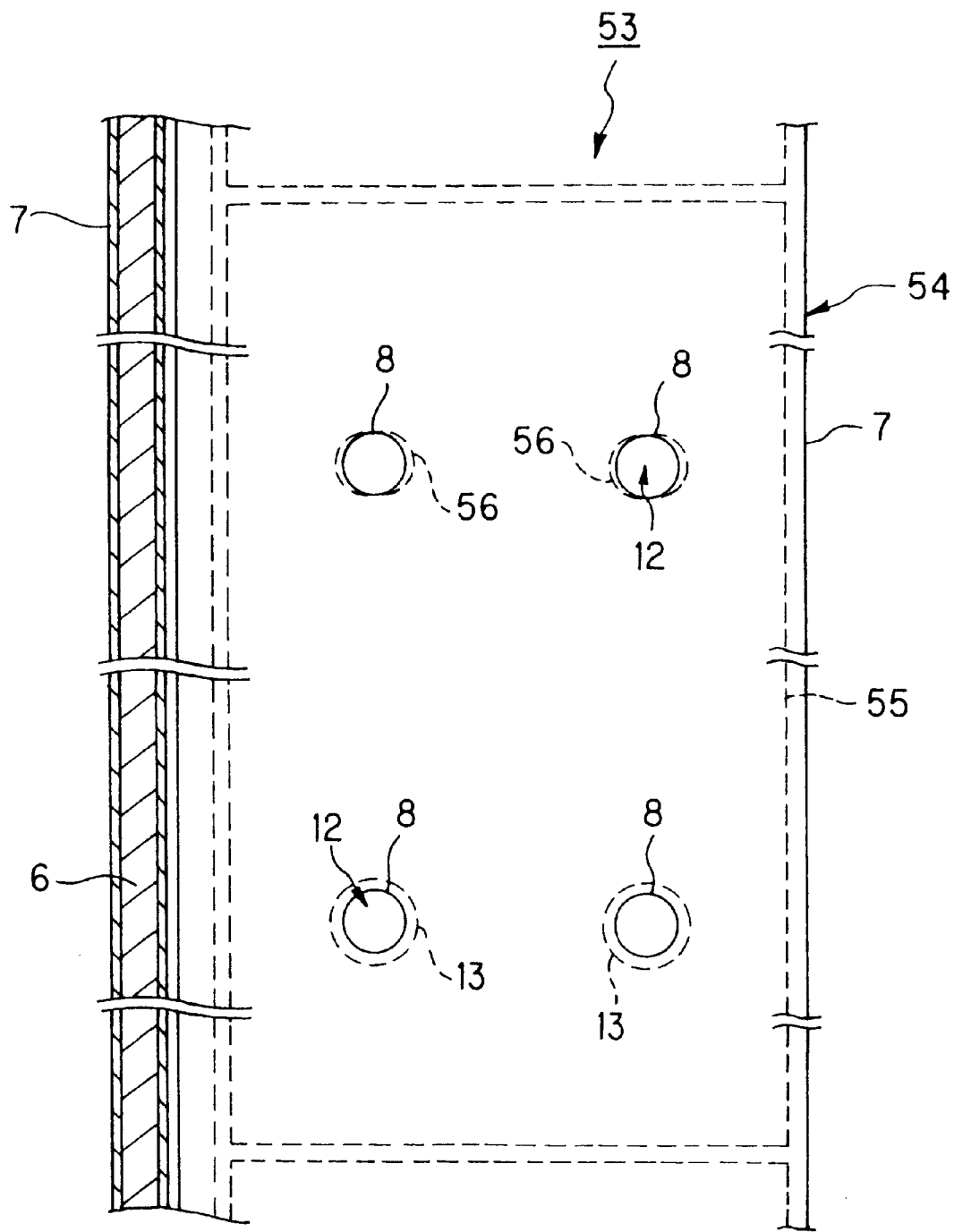
FIG. 9 represents a ninth embodiment of a control rod for a nuclear reactor according to the present invention and shows an enlarged front view of a wing.

FIG. 9 represents the ninth embodiment of the control rod of the present invention, showing an enlarged front view of a wing partially cut away.

A control rod 53 of this ninth embodiment has substantially the same structure as that of the sixth embodiment, and only the differences from the sixth embodiment will be described hereunder.

In this ninth embodiment shown in FIG. 9, the control rod 53 is provided with a U-shaped sheath 7 forming a wing 54 in which Hf plate pairs of integral type neutron absorbing elements comprising neutron absorber Hf plates 55 are accommodated, and transverse long holes (slots) serve as attachment holes 56 to be fitted to the support shafts 12b of the load supporting members 12 are pierced in the insertion leading end direction of the control rod 53 into the reactor core and the attachment hole 56 of the Hf plate 55 is formed as vertical slot in the wing width direction.

Therefore, between the support shaft 12b of the load supporting member 12 and the attachment hole 56 of the Hf plate 55, almost no gap is provided in the sheath longitudinal direction which is the control rod insertion/withdrawal direction, but a sufficient gap to absorb the difference due to the thermal expansion between the U-shaped sheath 7 made of SUS and the Hf plate 55 is provided in a direction at a right angle (90°) thereto.

In the structure mentioned above, upon insertion/ withdrawal of the control rod into or from the reactor core, an ordinary load and an impact load to the Hf plate 55 in the sheath 7 is held by the sheath 7 through the two attachment holes 56 on the insertion leading end side having almost no gap from the support shaft 12b of the load supporting member 12, through the load supporting member 12 and the sheath hole 8.

As a result, a not-specified single load supporting member 12 is not required to support all the impact load, thus permitting easy maintenance of the soundness of the U-shaped sheath 7.

In the ninth embodiment, although the arrangement of the attachment holes 56 of the Hf plate 55 corresponding to the two load supporting members 12 on the insertion leading end side has been specifically described, substantially the same functions and effects may be attained even if the arrangement is employed on the insertion terminal end side in place of the insertion leading end side.

Furthermore, this ninth embodiment includes also a structure or arrangement in which, in place of eliminating a gap in the control rod insertion/withdrawal direction in the transverse attachment holes 56 pierced in the Hf plate 55, the attachment holes pierced in the Hf plate and the gap in the control rod insertion/withdrawal direction are almost completely eliminated by forming a substantially oval cross-section of the supporting shaft 12b of the load supporting member 12.

FIG. 10 represents the tenth embodiment of the control rod of the present invention, in which FIG. 10A is an enlarged front view partially cut away, FIG. 10B is a longitudinal sectional view of FIG. 10A taken along the line XB—XB, FIG. 10C is an enlarged sectional view of the portion G shown in FIG. 10B, and FIG. 10D is a perspective view of a load supporting member.

The control rod 58 of the tenth embodiment includes a wing 58 as shown in FIG. 10A, and two Hf plates 61 are arranged opposite to each other with a water gap 11 to form an Hf plate pair 60 of integral type neutron absorbing elements in a U-shaped sheath 59, and two load supporting members 12 are provided, as in the conventional case, on the leading end side and on the terminal end side, respectively, in the control rod inserting direction to secure the same to the sheath 59.

There is also provided a friction load supporting member 62, as another load supporting member, at a portion near the central portion between the two Hf plates 61, each of which has a central interval maintaining portion 62a having an elongation in the control rod insertion direction and both end portions at which three support shafts 62b are formed.

Among three support shafts 62b of the friction load supporting member 62 shown in FIG. 10A, a long dotted line represents a shallow cut groove 61a provided on the sheath side surface of the Hf plate 61 and a small circle indicates a dimpling 59a provided on the sheath 59 from the outside surface toward the Hf plate 61 side. The dimpling 59a may be formed as an emboss surface.

An inner projection formed by the dimpling 59a in the sheath 59 engages with a recess which is the shallow cut groove 61a on the Hf plate 61 to achieve a frictional resistance function.

The control rod of the tenth embodiment will operate as follows.

The support shaft 62b of the frictional load supporting member 62 is engaged with and is secured to a sheath hole 8 pierced in the U-shaped sheath 59. The dimpling 59a of the sheath 59 therefore engages with the shallow cut groove 61a of the Hf plate 61, thus generating frictional resistance between the sheath 59 and the Hf plate 61.

Therefore, when conducting a relative movement of the Hf plate 61 relative to the sheath 59, the movement of the Hf plate 61 is inhibited in the frictional load supporting member 62, and hence, substantially the same functions and effects as in the eighth embodiment are attained.

Further, it is to be noted that processing of the Hf plate 61 surface as means for generating frictional resistance is not limited to the method based on the shallow cut groove 61a and a dish-shaped recess is also applicable for this purpose.

The load supporting member 63 shown in FIG. 10D is a concrete shape worked out using a conventional load supporting member 12, and the attachment holes 13 of the Hf plate 10 not shown are provided on both the sides of the supporting shaft 63b, and a water gap 11 is provided between the two Hf plates 10 having a gap maintaining portion 63a of the gap maintaining function. Crossing grooves 63c are provided on the surface of this gap maintaining portion 63a.

In the load supporting member 63 of the structure mentioned above, the surface of the gap maintaining portion 63a of the load supporting member 63 usually made of SUS comes into contact with the Hf plate 10 which is made of a metal other than SUS. When the water environment is poor, water-radiation-chemical corrosion may be caused by reactor water as cooling water in the reactor core during operation of the nuclear reactor.

However, because grooves 63c are provided on the surface of the gap maintaining portion 63a in contact with a different metal in the load supporting member 63, the presence of these grooves 63c prevents the reactor water from staying around the same, thus effectively maintaining the soundness of the load supporting member 63 near the load supporting member 63 and the Hf plate 10.

Although not specifically described for each case, it is easy to pay such an attention to the foregoing load supporting member 12 and the frictional load supporting member 62.

Figure 11:
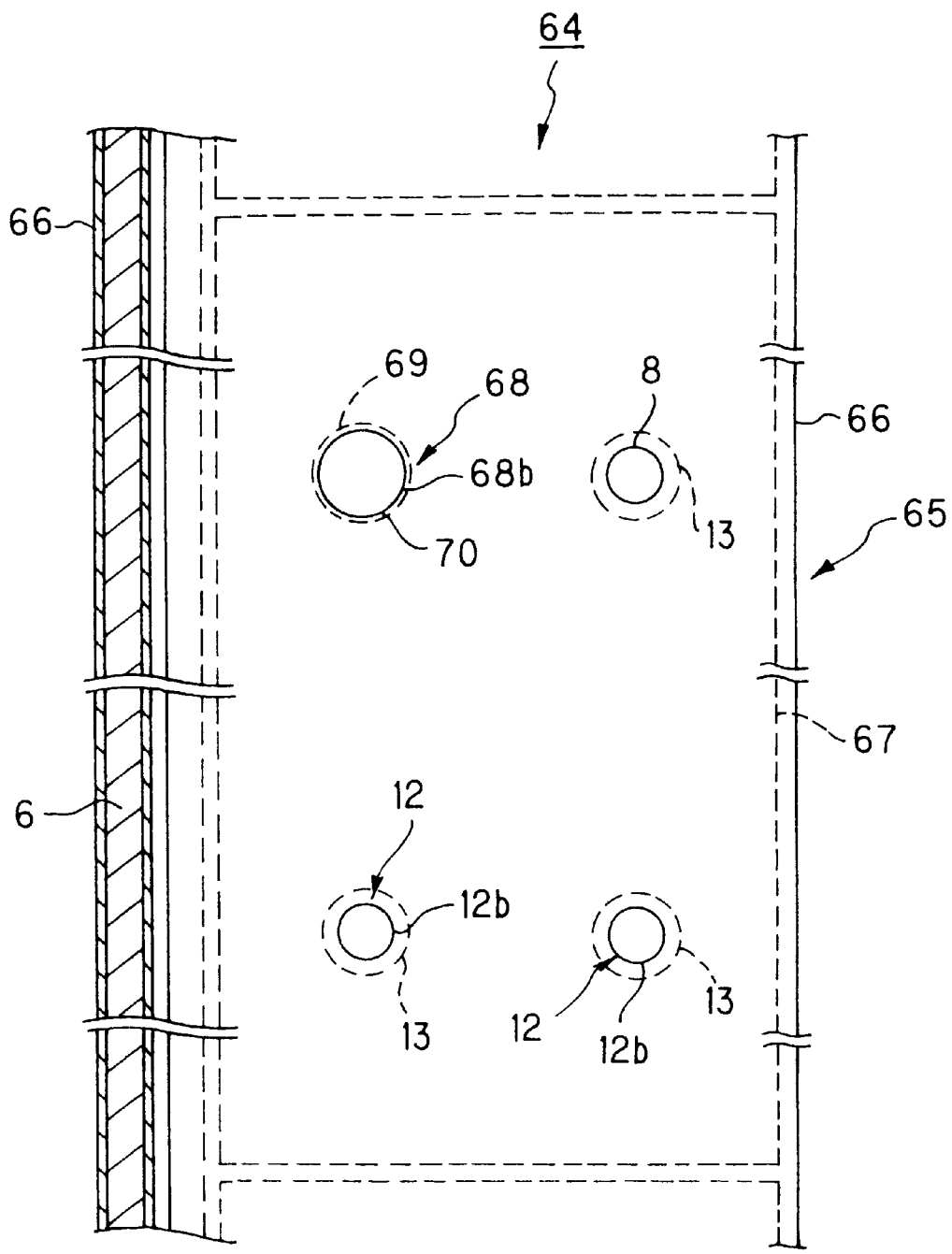
FIG. 11 represents an eleventh embodiment of a control rod for a nuclear reactor according to the present invention and shows an enlarged front view of a wing.

FIG. 11 represents the eleventh embodiment of the control rod of the present invention, showing an enlarged front view of a wing partially cut away.

In a U-shaped sheath 66 forming a wing 65 in a control rod 64, a plurality of Hf plate pairs formed by connecting two neutron absorber Hf plates 67 serving as integral type neutron absorbing elements with the load supporting member 12 are housed.

In the wing 65, a support shaft 68b of a single load supporting member 68 located on the integral type center structural member 6 side on the control rod insertion leading end side has a diameter larger than the diameter of the support shaft 12b of the other three load supporting members 12 in the Hf plate 67 and the sheath 66.

According to this arrangement, the diameter of the attachment hole 69 of the Hf plate 67 fitted to the support shaft 68b of the load supporting member 68 and the diameter of the sheath hole 70 of the U-shaped sheath 66 engaged with and secured to the support shaft 68 are made larger, and there is almost no gap between both the diameters.

A gap sufficient to avoid a trouble caused by a difference in the thermal expansion between the sheath 66 and the Hf plate 67 is provided between the attachment hole 13 of the other three Hf plates 67 and the support shaft 12b of the load supporting member 12.

In the structure of the eleventh embodiment, an ordinary load and an impact load acting on the Hf plate 67 are held, through the supporting shafts 68b of the load supporting members 68 having almost no gap therebetween by the sheath 66 arranged near the support shafts.

At this time, since the support shaft 68b has a large diameter and has therefore a longer contact surface with the sheath hole 70 of the sheath 66, the control rod can withstand a larger load than the conventional one, resulting in a longer service life and realizing an improved reliability.

In the eleventh embodiment, although an example of the control rod, in which the invention is applied on the side of the integral type center structural member 6 in the control rod insertion leading end direction, has been described above. This embodiment is not limited to such example and an optional one place may be selected.

The integral type center structural member side connected with the sheath 66 has usually a higher mechanical strength because the sheath 66 is reinforced by the integral type center structural member 6. Therefore, it is preferred that the present invention is effected to the integral type center structural member side as also referred to with reference to the former embodiments.

Figure 12:
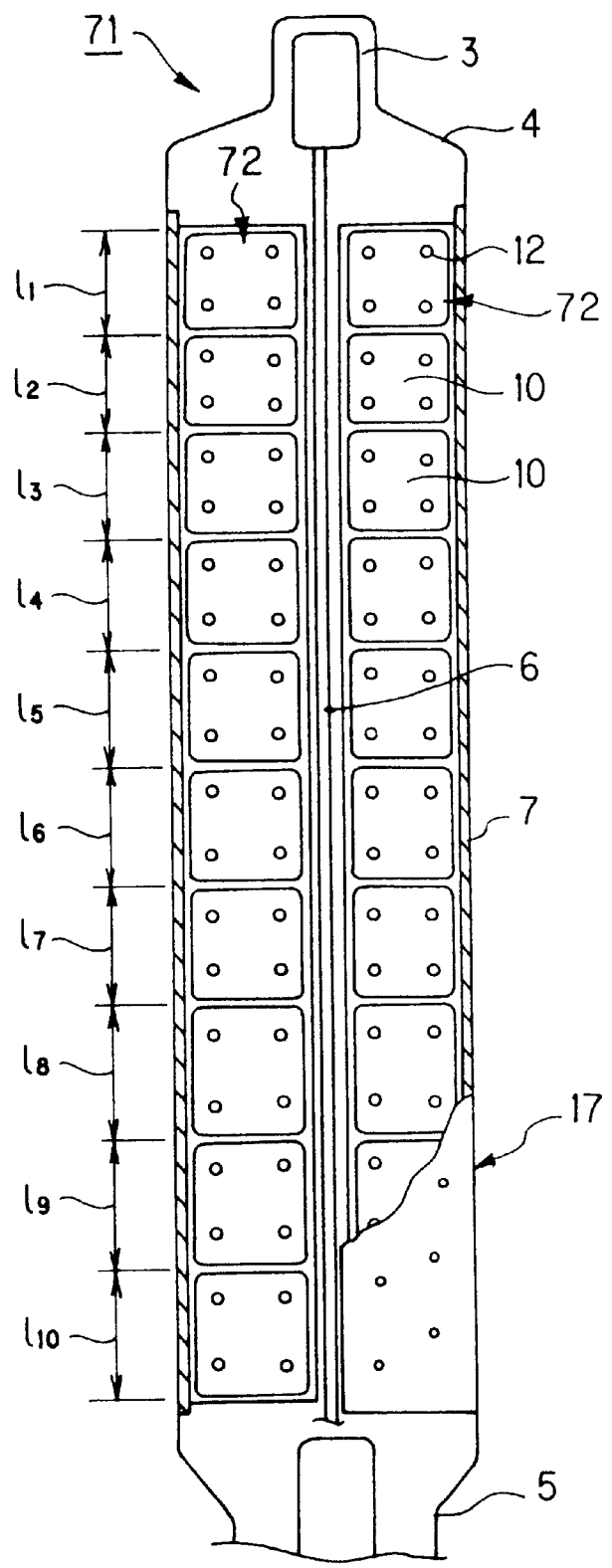
FIG. 12 represents a twelfth embodiment of a control rod for a nuclear reactor according to the present invention and shows a front view of a U-shaped sheath, partially cut away, constituting a wing.

FIG. 12 represents the twelfth embodiment of the control rod of the present invention, showing a front view of a sheath partially cut away.

With reference to FIG. 12, a control rod 71 houses Hf plate pairs 72 divided into a plurality of sections in the sheath longitudinal direction as integral type neutron absorbing elements in the U-shaped sheath 7 (for example, an Hf plate pair 72 divided into ten sections is accommodated).

The Hf plates forming the Hf plate pair 72 are made gradually thinner from the control rod insertion leading end (upper side) to the insertion terminal end (lower side) under the reactivity effect of the control rod 71 at the reactor core.

The lengths $1_1$ to $1_{10}$ of each Hf plate pair 72 in the sheath longitudinal direction are gradually longer from the control rod insertion leading end toward the insertion terminal end such as $1_1=1_2<1_3=1_4<1_5=1_6=1_7<1_8=1_9=1_{11}$.

The control rod 71 of the structure mentioned above will operate or function as follows.

As shown in FIG. 20B, in each neutron absorber Hf plate 10 of the integral type neutron absorbing element in a conventional control rod 1, the neutron absorbing ability is set high on the control rod insertion leading end side inserted in the reactor core.

Although the respective Hf plates 10 have the same vertical and horizontal dimensions, the thickness of the Hf plate 10 is made larger toward the control rod insertion leading end, and accordingly, the weight of the Hf plate 10 becomes larger toward the upper part which serves as the insertion leading end and the load applied to the sheath 7 also becomes larger toward the control rod insertion leading end.

In the control rod 71 of the twelfth embodiment, however, the weight is reduced by reducing the longitudinal size of the thick portion on the control rod insertion leading end side, thereby making it possible to achieve substantially a uniform load distribution applied to the sheath 7 by each Hf plate pair 72.

As a result, the load bearing at the portion supporting the load supporting member 12 at an unspecified position, particularly relatively near the insertion leading end of the U-shaped sheath 7, is alleviated, thus improving the soundness of the sheath 7 and the control rod 71.

In the twelfth embodiment described above, the case of the Hf plate pairs 72 serving as the integral type neutron absorbing elements in the trap structure has been presented. The structure is not however limited to the trap type, and even if it is applied to any other type structure, substantially the same functions and effects will be achieved.

Figure 13:
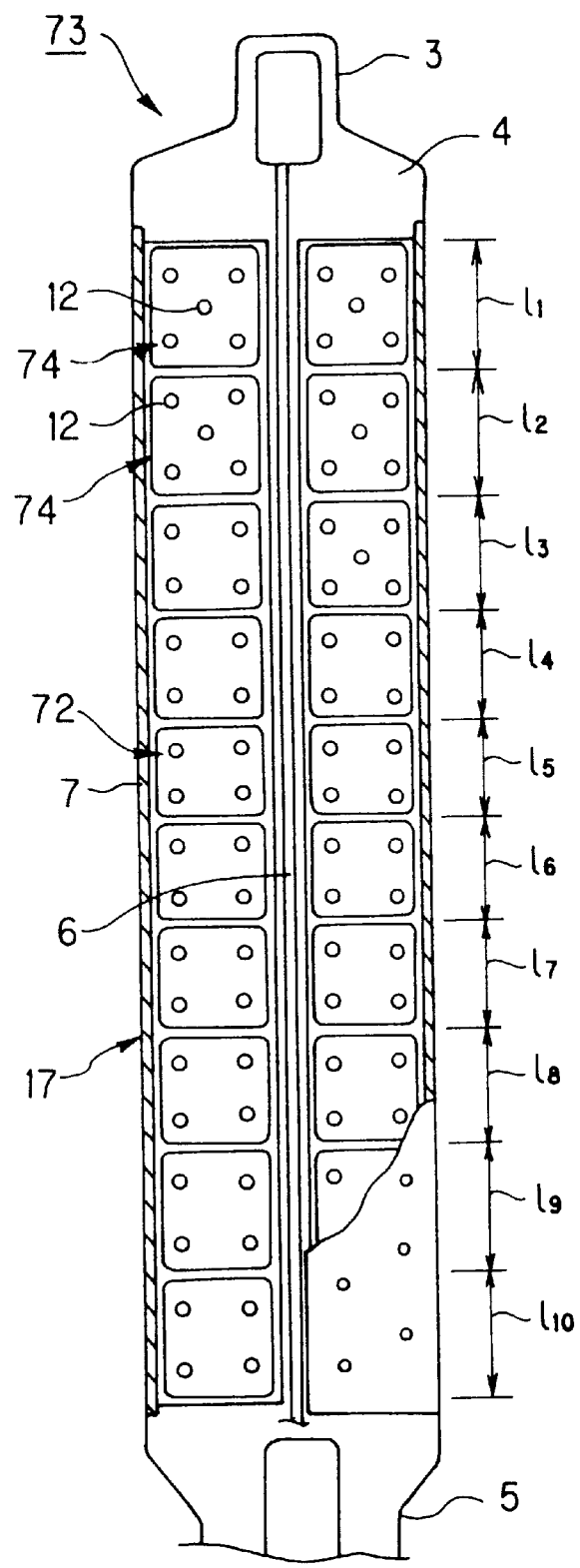
FIG. 13 represents a thirteenth embodiment of a control rod for a nuclear reactor according to the present invention and shows a front view of a U-shaped sheath, partially cut away, constituting a wing.

FIG. 13 represents the thirteen embodiment of the control rod of the present invention.

In a control rod 73 of this embodiment, the U-shaped sheath 7 having partially cut away structure is presented, and the sheath 7 houses Hf plate pairs 72 and 74 serving as integral type neutron absorbing elements divided into a plurality of sections (ten, for example, as shown in FIG. 13) in the sheath longitudinal direction.

The thickness of the Hf plates formed as the individual Hf plate pairs 72 and 74 is made gradually smaller from the control rod insertion leading end (upper side) toward the insertion terminal end (lower side).

The lengths $1_1$ to $1_{10}$ of the individual Hf plates pairs 72 and 74 in the sheath longitudinal direction become gradually longer from the central portion of the control rod toward the insertion leading end and the insertion terminal end such as $1_1=1_2<1_3=1_4<1_5=1_6<1_7<1_8=1_9=1_{10}$.

In addition to the four load supporting members around the three Hf plate pairs 74 on the control rod insertion end side, there is further provided a load supporting member 12 at the central portion thereof.

The control rod 73 of the thirteenth embodiment will operate or function as follows.

In the control rod 73 of this thirteenth embodiment, the lengths $1_1$ to $1_{10}$ of the Hf plate pairs 72 and 74 are shorter near the central portion of the total length of the control rod ($1_5$, $1_6$) and longer toward the control rod insertion leading end side and the terminal end side. Further, a load supporting member 12 is added to the central portion of the third Hf plate pair 74 from the insertion leading end side.

As a result, at the central portion of the control rod 73 to which a stress is seriously applied on an occurrence of an earthquake, the load supporting members 12 are more densely arranged with respect to the size of the Hf plate pair 72. Strength at the U-shaped sheath 7 is therefore improved, and in this case, the load supporting members 12 serve as sheath reinforcing member or a stiffener.

The Hf plate pair on the control rod insertion leading end side, at the central portion of which the load supporting member 12 is added, has a large thickness and a large weight because of the arrangement position thereof, and a larger load is applied on the sheath 7 as well as the load supporting member 12. However, the large number of load supporting members 12 alleviates the load bearing per load supporting member 12 and also reduces local stress in the U-shaped sheath 7, thus improving the supporting function to an impact load resulting from insertion and withdrawal of the control rod and the reaction to the seismic stress.

Further, the configuration or structure of the Hf plate pairs 72 and 74 of this thirteenth embodiment is not limited to the trap type as in the above case and other cases may be adopted.

Figure 14:
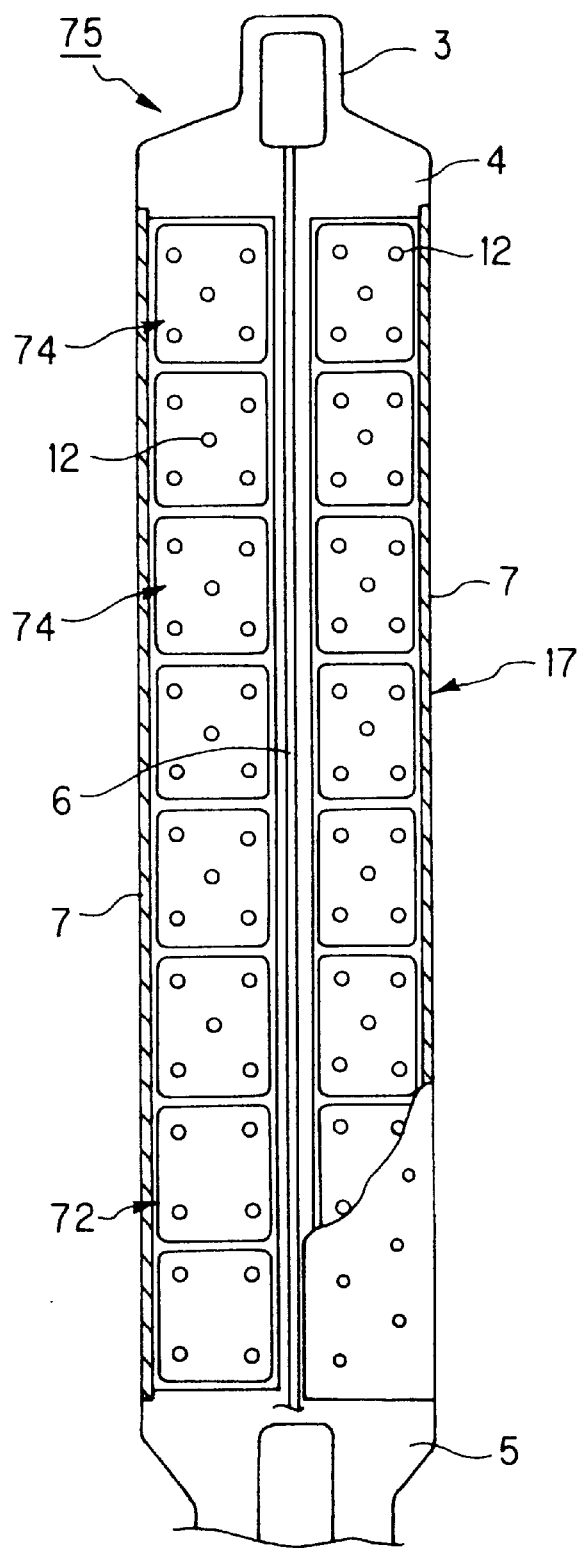
FIG. 14 represents a fourteenth embodiment of a control rod for a nuclear reactor according to the present invention and shows a front view of a U-shaped sheath, partially cut away, constituting a wing.

FIG. 14 represents the fourteenth embodiment of the control rod of the present invention, showing a front view of a sheath partially cut away.

In the control rod 75 of this embodiment, the U-shaped sheath 7 houses Hf plate pairs 72 and 74, serving as the integral type neutron absorbing element, divided into a plurality of sections (for example, eight sections as viewed) in the sheath length direction.

The thickness of the neutron absorber Hf plates forming the individual Hf plate pairs 72 and 74 gradually becomes smaller from the control rod insertion leading end side toward the insertion terminal end side.

Although the length in the sheath longitudinal direction is made uniform for the individual Hf plate pairs 72 and 74, there is adopted an arrangement in which the Hf plate pair 74, together with four load supporting members on the periphery, is provided with one additional load supporting member 12 arranged at the central portion thereof and accommodated in the wing 17 up ¾ length of the total length from the control rod insertion end side.

According to the above-mentioned structure, the control rod insertion leading end has thicker and heavier Hf plates of the Hf plate pair, and a load supporting member 12 is added at the central portion of the control rod in the longitudinal direction thereof for the Hf plate pair 74. Therefore, local stress of the U-shaped sheath 7 bearing the load through the individual load supporting members 12 and the additional load supporting member 12 is alleviated.

Since the control rod 75 of this embodiment has a relatively simple construction, it is easy to manufacture the same. It is also to be noted that the structure of the Hf plate pair 74 of this fourteenth embodiment is not limited to the trap type as mentioned before with reference to the former embodiments.

Figures 15A, 15B:
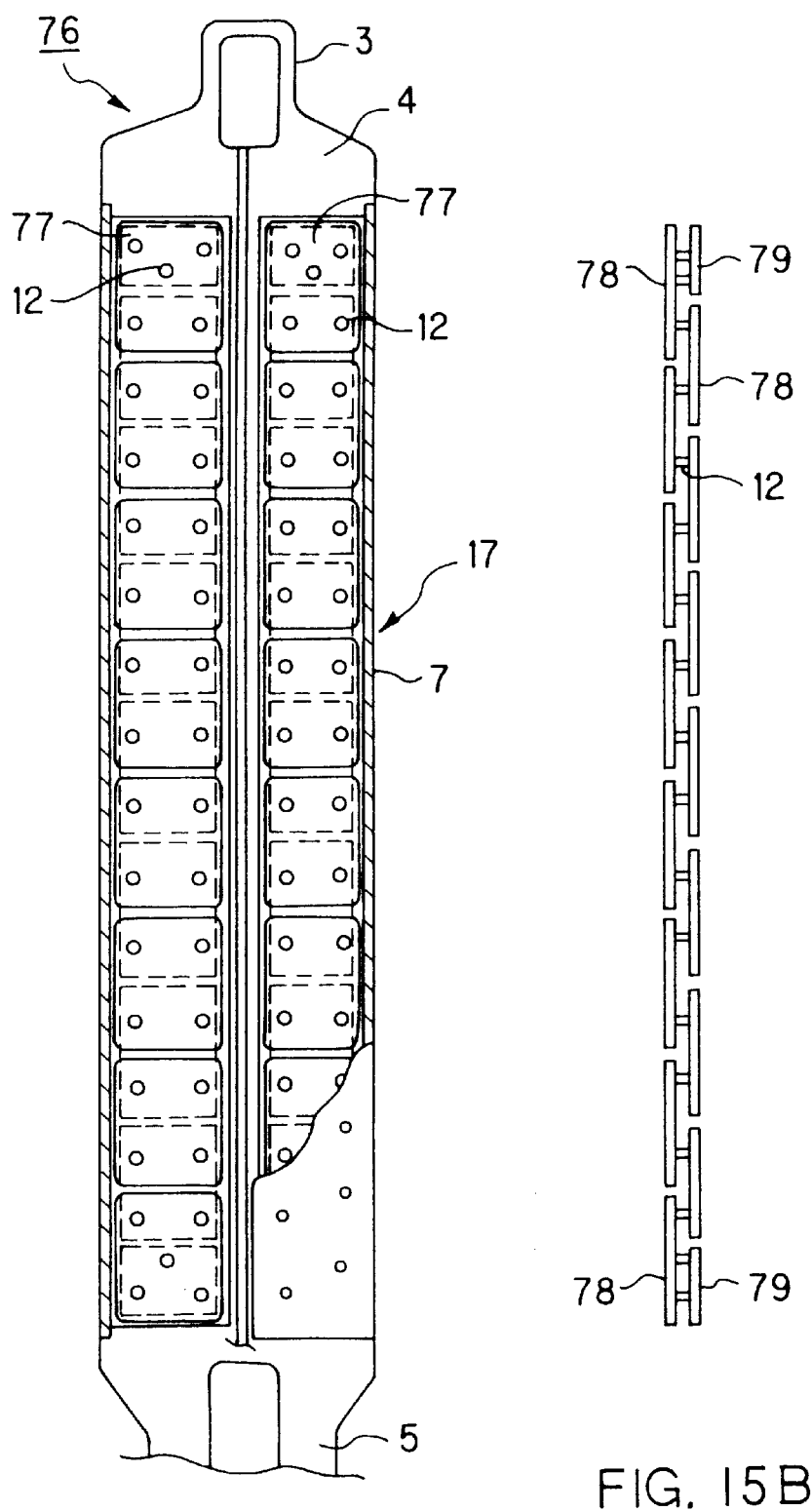
FIG. 15A shows a front view of a U-shaped sheath, partially cut away, constituting a wing
FIG. 15B is a side view of an Hf plate of FIG. 15A.

FIG. 15 represents the fifteenth embodiment of the control rod of the present invention, in which FIG. 15A is a front view of a sheath partially cut away and FIG. 15B is a side view of an Hf plate of FIG. 15A in a control rod 76. The U-shaped sheath 7 houses integral type neutron absorbing elements divided into a plurality of sections in the sheath longitudinal direction (for example, eight sections).

The Hf plate pair 77 has an arrangement in which a neutron absorber Hf plate 78 having a length equal to ⅛ length of the total length and an Hf 79 plate having a ½ length thereof are supported by the load supporting member 12 and held in the U-shaped sheath 7 to thereby constitute the wing 17, and as shown in FIG. 15B, on both the sides of the load supporting member 12, the Hf plate 78 is disposed on one side and Hf plates 79 are disposed on the other side at the leading end and the trailing end thereof. The Hf plate 78 is arranged between them with being shifted by ½ pitch respectively.

According to such arrangement of the fifteenth embodiment, a gap between the Hf plates 78 and 79 on one side and on the other side in the sheath longitudinal direction is formed in a stepwise form. For the Hf plates 79 arranged at the leading end and the trailing end, a load supporting member 12 is provided near the central portion of the Hf plate 78, independently from the four load supporting members 12 provided for the Hf plate 78 between the Hf plate 79 and the opposing Hf plate.

According to the control rod of this embodiment, in the Hf plate pair 77 formed with a plurality of neutron absorber Hf plates 78 and 79 within the U-shaped sheath 7, since there is no gap crossing the sheath 7 in the sheath longitudinal direction at right angles to the control rod insertion/withdrawal direction, the reactivity value of the control rod 76 can be improved.

Furthermore, since the U-shaped sheath 7 housing the plurality of Hf plate pairs 77 is supported by the Hf plates 78 and 79 arranged stepwise, the mechanical strength of the control rod in the transverse direction can be improved.

Figure 16:
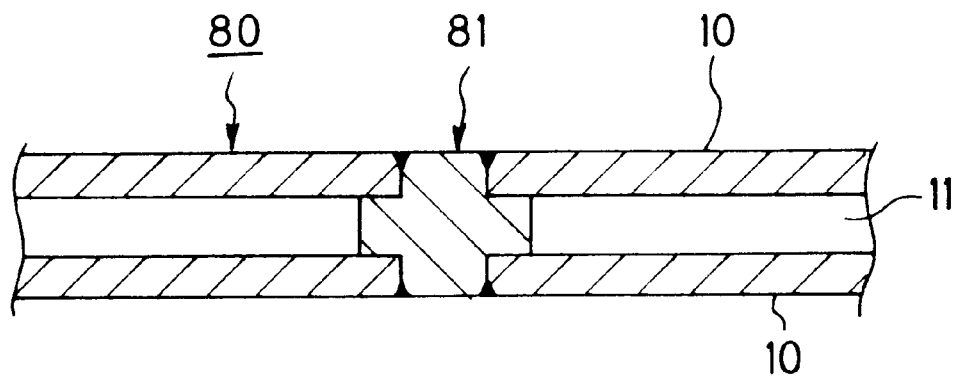
FIG. 16 represents a sixteenth embodiment of a control rod for a nuclear reactor according to the present invention and shows an enlarged sectional view of an Hf plate to be accommodated in a wing.

FIG. 16 represents the sixteenth embodiment of the control rod of the present invention, showing an enlarged sectional view of an Hf plate.

With reference to the control rod of FIG. 16, a plurality of Hf plate pairs 80 serving as integral type neutron absorbing elements housed in the sheath 7, not shown, in a wing of the control rod are supported by the load supporting members 12 of the structure shown in FIG. 19C by arranging two Hf plates 10 opposite to each other, and a gap maintaining member 81 is provided between the plurality of load supporting members 12 to secure the Hf plate pair 80 to the sheath 7.

The gap maintaining member 81 has a top-like spacer shape, keeping a water gap 11 in the central portion of the Hf plate pair 80 and secured by means of welding through the engagement of the shafts at both the ends with a hole pierced in the Hf plate 10.

According to the control rod of the structure of this sixteenth embodiment, in the Hf plate pair 80 serving as integral type neutron absorbing elements for the control rod, it will be considered that when the neutron absorber Hf plate 10 has a small thickness, the gap maintaining function and the reinforcing function of the load supporting members 12 may be degraded at a position apart from the attaching positions of the load supporting members 12, thus making the Hf plate more deflective.

When the thin Hf plate deflects, the reinforcing ability of the Hf plate 10 to the sheath 7 becomes almost non-existent, and when the Hf plate 10 deflects inward, the water gap becomes narrows, leading to a deterioration of the reactivity value of the control rod.

In the Hf plate pair 80 of the control rod of this embodiment, however, the gap maintaining member 81 reinforces the thin Hf plate 10, in addition to the load supporting members 12. Accordingly, it is possible to prevent deflection of the Hf plate 10 and a decrease in the reactivity value of the control rod.

Apart from the top-like shape mentioned above, the gap maintaining member 81 may take the form of a shell alignment to arrange the same between two Hf plates 10 to secure it by means of welding from both the sides of the Hf plate 10.

Figure 17:
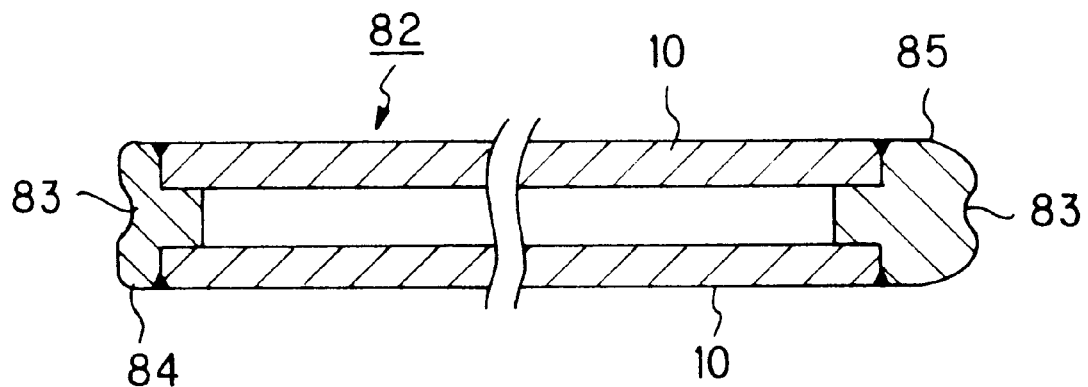
FIG. 17 represents a seventeenth embodiment of a control rod for a nuclear reactor according to the present invention and shows an enlarged sectional view of an Hf plate to be accommodated in a wing.

FIG. 17 represents the seventeenth embodiment of the control rod of the present invention, and although the control rod of this embodiment is substantially the same as that of the embodiment shown in FIG. 16, the Hf plate pair to be housed in the U-shaped sheath 7 of the wing of the control rod is formed from an Hf alloy sheet which is an integral type neutron absorbing element.

More specifically, the Hf alloy sheet is prepared, in place of the thin Hf plate 10 in the sixteenth embodiment, by increasing the content of zirconium while keeping an absolute Hf content substantially equal to the conventional one.

According to the structure of the control rod of this seventeenth embodiment, in order to obtain an Hf alloy having the same neutron absorbing function as that of the Hf plate 10 for use in a control rod, it would be necessary to increase the thickness of the Hf alloy sheet, thus increasing the mechanical strength, thereby improving the mechanical strength of the resultant control rod including the sheath 7.

Although this tends to cause a slight increase in the total weight of the control rod, as a total effect, an excellent mechanical strength can be achieved with the same effects as those in the sixteenth embodiment.

As shown in FIG. 17 in the enlarged sectional view, a plurality of Hf plate pairs 82 accommodated in the U-shaped sheath of the wing of the control rod each is composed of the opposed two Hf plates 10 and supported by the load supporting members 12 of the structure shown in FIG. 19C.

Furthermore, side end Hf bars 84 provided with water-pass channels 83 forming water passages therebetween and the integral type center structural member 6 are secured by means of welding to portions inside in the wing width direction (on the side of the integral type center structural member 6) at the side ends in the sheath longitudinal direction of the two opposing Hf plates 10.

Further, on the side end opposite to the integral type center structural member 6 (outside the wing width direction), a side end Hf bar 85 provided with the water-pass channel 83 forming a water passage in the space separating the same from the inside of the sheath 7 not shown is secured by means of welding so as to provide a box-shape cross-section.

The control rod of the seventeenth embodiment will operate or function as follows.

In the Hf plate pair 82 of the control rod, the cross-section thereof is basically a box shape, and furthermore, a water passage is formed in the control rod inserting direction which is the sheath longitudinal direction.

That is, a water-pass channel 83 of the side end Hf bar 84 is provided on the integral type center structural member 6 side, and on the opposite side to the integral type center structural member 6, there is also provided a water passage formed by the water-pass channel 83 of the side end Hf bar 85.

According to such arrangement, in spite of the trap structure of the control rod, the side ends are reinforced by the side end Hf bars 84 and 85, and the basic box shape of the overall cross-section increases the strength of the Hf plate pairs 82, resulting in a considerable improvement of the mechanical strength of the control rod, together with the sheath 7, through the reinforcement by this Hf plate pair 82.

Although the control rod of the seventeenth embodiment shown in FIG. 17 is applicable to almost all trap-type control rod, it is particularly effectively applicable to a case of the neutron absorbing Hf plate having relatively thin thickness.

That is, the stiff and rigid Hf plate can be provided even when it has relatively thin thickness and, moreover, there is almost no limitation to the load supporting method, so that the control rod of this embodiment will be applicable to the respective embodiments mentioned hereinbefore.

Figure 18:
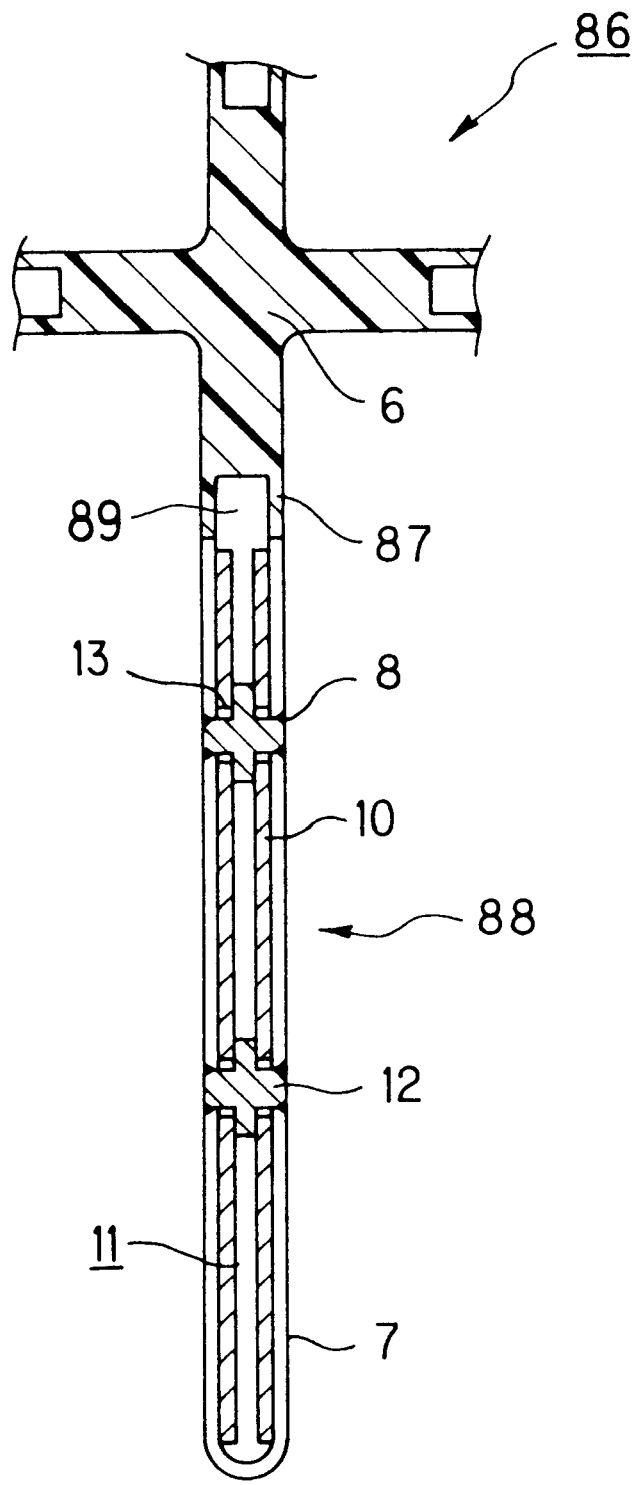
FIG. 18 represents an eighteenth embodiment of a control rod for a nuclear reactor according to the present invention and shows a sectional view of a fixing structure of an integral center structural member and a U-shaped sheath.

FIG. 18 represents the eighteenth embodiment of the control rod of the present invention.

The control rod 86 of this eighteenth embodiment has the integral type center structural member 6 which is formed so as to provide a cruciform cross-section and equal central angles of four projections 87 thereof. Each of the projections 87 extends in the longitudinal direction of the integral type center structural member 6 and has a thickness substantially equal to that of a wing 88. A recessed portion 89 may be formed to the front end of the projection 87 as occasion demands to provide a recessed projection 87. An opening portion of the U-shaped sheath 7 constituting the wing 88 is abut-welded and secured to the recessed projection 87.

According to the control rod 86 of this embodiment, the recessed projection 87 of the integral type center structural member 6 has the same thickness as that of the wing 88 and the U-shaped sheath 7 of the wing 88 abutting against the recessed projection 87 has substantially the same thickness, so that the welding heat is substantially equally transmitted to both the members. Therefore, any welding defective will be eliminated at the time of welding of the projection 87 to the sheath 7 as well as elimination of crevis environment, achieving improved reliability of the welded portion and also increasing yield strength. That is, since an occurrence of any crack of the welded portion under the crevis environment can be eliminated, the frequency of changing of the control rods and the increasing of radioactive waste can be effectively reduced, thus being advantageous even in economical viewpoint. Further, in an arrangement in which the Hf plate extends in a space 89, the reactivity value of the control rod will be further improved, for example, in a manner that the Hf plate is provided in slightly bent manner inside in the space 89.

The securing structure of the U-shaped sheath to the central structural member of the eighteenth embodiment of FIG. 18 may be applicable to the other embodiments mentioned above by way of FIGS. 1 to 17.

According to the various embodiments of the present invention mentioned above, it is possible to solve the conventional problems of non-agreement of the mechanical service life with the nuclear life of a conventional long-life type control rod against neutron and the service period tending to be restricted by the mechanical service life. Increasing mechanical and physical strengths allow alignment of the nuclear life and the mechanical life and give a control rod of a further longer life. These advantages improve safety and economic merits of nuclear power generation and permit reduction of the quantity of generated radioactive waste.

It is to be noted that the present invention is not limited to the described embodiments and many other changes, modifications and combinations may be made without departing from the scopes of the appended claims.

What is claimed is:

1. A control rod for a nuclear reactor, comprising:

a center structural member; and a plurality of wings each including a sheath member of long plate structure having a U-shaped cross section having an opening which is secured to the center structural member, a front end structural member secured to a front end side of the wing viewed from a wing inserting direction in a reactor core, a terminal end structural member secured to a terminal end side of the wing viewed from the wing inserting direction in the reactor core, a plurality of neutron absorbing elements each having a plate structure accommodated in each of said sheaths in a row in a longitudinal direction thereof and each being formed of one or more neutron absorbing plates, and a plurality of load supporting members for supporting weights of the neutron absorbing elements, wherein respective lengths in the sheath longitudinal direction of the neutron absorbing elements closer to the front end structural member are smaller than respective lengths in the sheath longitudinal direction of the neutron absorber elements further from the front end structural member, and the neutron absorbing elements are supported to the U-shaped sheath by the load supporting members to thereby reduce a local load applied to the U-shaped sheath.

2. A control rod for a nuclear reactor, comprising:

a center structural member; and a plurality of wings each including
- a sheath member of long plate structure having a U-shaped cross section having an opening which is secured to the center structural member,
- a front end structural member secured to a front end side of the wing viewed from a wing inserting direction in a reactor core,
- a terminal end structural member secured to a terminal end side of the wing viewed from the wing inserting direction in the reactor core,
- a plurality of neutron absorbing elements each having a plate structure accommodated in each of said sheaths in a row in a longitudinal direction thereof and each being formed of one or more neutron absorbing plates, and
- a plurality of load supporting members for supporting weights of the neutron absorbing elements, wherein at least a part of the plurality of load supporting members supporting the neutron absorbing element is arranged in a vicinity of a central portion of the neutron absorbing element, and said neutron absorbing element is composed of a hafnium metal or a long-lived type neutron absorbing plate by forming a hafnium alloy into a plate shape diluted by diluting hafnium with a diluting agent such as zirconium or titanium, and said neutron absorbing element has a trap structure based on a combination of a plurality of said neutron absorber plates with a water gap serving as a reactor water channel, and the load supporting member is provided with means for maintaining a gap between the neutron absorber plates.

3. A control rod for a nuclear reactor, comprising:

a center structural member; and a plurality of wings each including
- a sheath member of long plate structure having a U-shaped cross section having an opening which is secured to the center structural member,
- a front end structural member secured to a front end side of the wing viewed from a wing inserting direction in a reactor core,
- a terminal end structural member secured to a terminal end side of the wing viewed from the wing inserting direction in the reactor core,
- a plurality of neutron absorbing elements each having a plate structure accommodated in each of said sheaths in a row in a longitudinal direction thereof and each being formed of one or more neutron absorbing plates, and
- a plurality of load supporting members for supporting weights of the neutron absorbing elements, wherein said neutron absorbing element includes a hafnium metal formed into a plate shape, said integral type neutron absorbing element has a trap structure based on a combination of a plurality of said neutron absorber plates with a water gap being interposed therebetween, the neutron absorber plate has a thickness gradually reduced from the leading end side of the control rod insertion toward the terminal end side thereof and the load supporting member to be secured to the U-shaped sheath is fitted to an attachment hole with a predetermined margin, two such load supporting members are each provided at an interval in the sheath longitudinal direction, and an interval maintaining member secured to the U-shaped sheath at opposing central portions thereof in a wing width direction and in a sheath longitudinal direction between the load supporting members is mounted to at least one set of the neutron absorbing elements.

* * * * *